(12) United States Patent
Hayashi

(10) Patent No.: US 7,626,716 B2
(45) Date of Patent: Dec. 1, 2009

(54) RECORDING APPARATUS AND RECORDING CONTROL METHOD FOR EXECUTING RECORDING ACCORDING TO SETTING OF PRINT PARAMETERS BY WIRELESS DEVICE

(75) Inventor: Hiroki Hayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 874 days.

(21) Appl. No.: 10/873,736

(22) Filed: Jun. 21, 2004

(65) Prior Publication Data

US 2004/0257605 A1    Dec. 23, 2004

(30) Foreign Application Priority Data

Jun. 23, 2003    (JP)    ............... 2003-178617

(51) Int. Cl.
  *G06F 3/12*    (2006.01)
  *H04N 5/225*    (2006.01)
(52) U.S. Cl. .................... 358/1.15; 348/207.2
(58) Field of Classification Search ............... 358/1.15; 348/207.2
  See application file for complete search history.

(56) References Cited

U.S. PATENT DOCUMENTS

| 5,250,986 | A  | * | 10/1993 | Axten et al. ................ 341/23 |
| 5,638,183 | A  | * | 6/1997  | Hayashi et al. ............. 358/300 |
| 6,417,913 | B2 | * | 7/2002  | Tanaka ........................ 355/39 |
| 7,414,746 | B2 | * | 8/2008  | Tanaka et al. ............. 358/1.15 |
| 2001/0029531 | A1 | * | 10/2001 | Ohta ........................... 709/223 |
| 2001/0055121 | A1 | * | 12/2001 | Omura et al. ................ 358/1.9 |
| 2002/0016833 | A1 | * | 2/2002  | Yajima et al. ............... 709/220 |
| 2002/0036795 | A1 | * | 3/2002  | Fujitani ..................... 358/1.15 |
| 2002/0060804 | A1 | * | 5/2002  | Mochimaru et al. ........ 358/1.15 |
| 2003/0002071 | A1 | * | 1/2003  | Berkema et al. ........... 358/1.15 |
| 2003/0071903 | A1 |   | 4/2003  | Nakami |
| 2004/0001217 | A1 | * | 1/2004  | Wu ............................. 358/1.15 |
| 2004/0137919 | A1 | * | 7/2004  | Biundo ....................... 455/466 |
| 2004/0137928 | A1 | * | 7/2004  | Biundo ....................... 455/517 |

FOREIGN PATENT DOCUMENTS

| EP | 1 271 301 A2  | 1/2003  |
| JP | 62-253473 A   | 11/1987 |
| JP | 05-050665 A   | 2/1993  |
| JP | 07-121328 A   | 12/1995 |
| JP | 2001-75765 A  | 3/2001  |
| JP | 2003-009075 A | 1/2003  |
| WO | WO 02/076082 A1 | 9/2002 |

* cited by examiner

*Primary Examiner*—Twyler L Haskins
*Assistant Examiner*—Fred Guillermety
(74) *Attorney, Agent, or Firm*—Canon USA Inc IP Division

(57) ABSTRACT

A terminal such as a cellular phone sends setting data including print parameters to a printer by wireless. Upon receiving the setting data, the printer sets print parameters in a print controller according to the setting data. The printer then renders image data transmitted by wireless from the cellular phone, forming a rendered image, and prints the rendered image by the print controller. When setting data is not received, the printer sets default print parameters. According to the default print parameters, the printer renders image data transmitted by wireless from the cellular phone, forming a rendered image, and prints the rendered image.

6 Claims, 19 Drawing Sheets

US 7,626,716 B2

RECORDING APPARATUS AND RECORDING CONTROL METHOD FOR EXECUTING RECORDING ACCORDING TO SETTING OF PRINT PARAMETERS BY WIRELESS DEVICE

BACKGROUND OF THE INVENTION

1. Field of the Invention

The present invention relates to recording apparatuses and recording control methods that allow receiving and recording data transmitted by wireless from outside. More specifically, the present invention relates to a recording apparatus and a recording control method that allow receiving and recording data including image data, transmitted by wireless from an image-data supplying device such as a cellular phone.

2. Description of the Related Art

Conventional printers usually receive image data transmitted from connected computers that serve as host apparatuses, and execute printing based on the image data received. Recently, as digital cameras become more common, other types of printers have become available. For example, some printers have slots for mounting memory cards storing image data captured by digital cameras, which can be attached to and detached from the digital cameras, so that the printers are capable of directly reading the image data stored on the memory cards and printing the image data. As another example, some printers are connected to digital cameras via USB (Universal Serial Bus) interfaces or other special interfaces so that the printers can receive image data directly from the digital cameras and print the image data. The printers described above are allowed to print images without host apparatuses acting between the printers and digital cameras. Print setting for printing the image is made via operation panels of the printers, or via operation panels of the digital cameras connected to the printers.

Recently, cellular phones having imaging capability equivalent to that of digital cameras have become available, allowing imaging with a number of pixels for recording (i.e., resolution) equivalent to that of ordinary digital cameras.

Furthermore, some cellular phones have interfaces for infrared communications with external devices, allowing infrared communications by wireless with external devices. Such cellular phones can be used, for example, as remote controllers for television sets, or allow exchanging data or captured images between cellular phones without using a telephone circuit.

An ink-jet printer having such an infrared communication interface is disclosed in Japanese Patent Laid-Open No. 2001-75765.

The ink-jet printer disclosed in Japanese Patent Laid-Open No. 2001-75765 has a plurality of interfaces including an infrared communication interface, and switching among the plurality of interfaces can be monitored. However, the document does not disclose or suggest a scheme for using the infrared communication interface to allow printing of image data transferred via, for example, the infrared communication interface of the cellular phone described above.

Although the cellular phone described above allows exchanging data by wireless communications through the infrared communication interface, in order to print an image captured by the digital camera function provided in the cellular phone, the following procedure must be taken. First, image data is transferred from the cellular phone to a computer via the Internet using a telephone line. The image data is once saved in the computer, and the computer sends the image data to a printer. Then, the printer prints the image data. Thus, the conventional scheme requires many and complex operations for printing.

Furthermore, in the case of a printer for the general user, connected to a computer, operations and setting for printing are executed at the computer. Thus, complex operations are not allowed with the printer alone. Furthermore, formats of image data transmitted by wireless communications through infrared communication interfaces of cellular phones vary among manufacturers. Therefore, a convenient and reliable method for sending images captured by cellular phones having infrared communication interfaces to printers having compatible infrared communication interfaces and printing the images by the printers.

When image data to be printed is sent to a printer using a printer driver installed on a computer connected to the printer, number of copies, print size, type of paper used as a recording medium for printing, print quality, and the like, are specified for each print command. Then, image data with such setting is sent to the printer so that the image data will be printed according to setting desired by a user. However, a small terminal such as a cellular phone is only capable of communications mainly aimed at exchanging data or files stored therein, and does not allow various setting for printing. Furthermore, implementing functions of a printer driver in a cellular phone leads to increase in cost of the cellular phone and is not therefore practical.

SUMMARY OF THE INVENTION

The present invention has been made in order to overcome the problems described above, and it is an object of the present invention to provide a recording apparatus and a recording control method for receiving and recording image data transmitted by wireless from an image-data supplying device and for allowing setting of desired recording parameters from the image-data supplying device.

It is another object of the present invention to provide a recording apparatus and a recording control method that allows setting of desired recording parameters by key operations of a recording apparatus.

It is another object of the present invention to provide a recording apparatus having a plurality of interfaces and a recording control method that allow setting of desired recording parameters for each of the plurality of interfaces.

The present invention, in one aspect thereof, provides a recording apparatus for receiving and recording data transmitted by wireless from an image-data supplying device, the recording apparatus including a setting unit for setting one or more recording parameters included in setting data received from the image-data supplying device; and a recording control unit for recording an image on a recording medium based on image data included in data transmitted from the image-data supplying device separately from the setting data; wherein when the recording parameters have been set by the setting unit, the recording control unit records an image according to the recording parameters.

The present invention, in another aspect thereof, provides a recording apparatus for receiving and recording data transmitted by wireless from an image-data supplying device, the recording apparatus including a key operation unit having one or more keys that can be operated by a user; and a setting unit for setting one or more recording parameters according to a predefined key operation by the key operation unit; and a recording control unit for recording an image on a recording medium based on image data included in data transmitted from the image-data supplying device separately from the setting data; wherein when the recording parameters have been set by the setting unit, the recording control unit records an image according to the recording parameters.

The present invention, in another aspect thereof, provides a recording apparatus for recording an image on a recording medium, the recording apparatus including a first interface for receiving data transmitted by wireless from an image-data supplying device; a second interface for receiving data transmitted from an externally connected host apparatus; a first recording control unit for extracting image data included in data received via the first interface, the data having a data format that is dependent on the image-data supplying device, decoding the image data extracted, rendering the decoded image data to form a rendered image, and recording an image based on the rendered image; a second recording control unit for recording an image based on data transmitted from the externally connected host apparatus via the second interface; and a setting unit for setting one or more image recording parameters for each of the first and second interfaces.

The present invention, in another aspect thereof, provides a recording apparatus for recording an image on a recording medium, the recording apparatus including a plurality of interfaces for receiving data transmitted by wireless from an image-data supplying device, the plurality of interfaces supporting mutually different communication methods; a recording control unit for recording an image based on data received via one of the plurality of interfaces; and a setting unit for setting one or more image recording parameters individually for each of the plurality of interfaces.

The present invention, in another aspect thereof, provides a recording control method of a recording apparatus for receiving and recording data transmitted by wireless from an image-data supplying device, the recording control method including a setting step of setting one or more recording parameters included in setting data transmitted from the image-data supplying device; and a recording control step of recording an image on a recording medium based on image data included in data transmitted from the image-data supplying device separately from the setting data; wherein when the recording parameters have been set in the setting step, an image is recorded according to the recording parameters in the recording control step.

The present invention, in another aspect thereof, provides a recording control method of a recording apparatus for receiving and recording data transmitted by wireless from an image-data supplying device, the recording control method including a key input step of inputting key information according to an operation by a user; a setting step of setting one or more recording parameters according to a predefined key operation in the key input step; and a recording control step of recording an image based on image data included in data transmitted from the image-data supplying device, the data having a data format that is dependent on the image-data supplying device; wherein when the recording parameters have been set in the setting step, an image is recorded according to the recording parameters in the recording control step.

The present invention, in another aspect thereof, provides a recording control method for recording an image on a recording medium, the recording control method including a first receiving step of receiving, via a first interface, data transmitted by wireless from an image-data supplying device; a second receiving step of receiving, via a second interface, data transmitted from an externally connected host apparatus; a first recording control step of extracting image data included in data received via the first interface, the data having a data format that is dependent on the image-data supplying device, decoding the image data extracted, rendering the decoded image data to form a rendered image, and recording an image based on the rendered image; a second recording control step of recording an image based on data transmitted from the externally connected host apparatus via the second interface; and a setting step of setting one or more image recording parameters for each of the first and second interfaces.

According to the present invention, it is possible to receive and record image data transmitted by wireless from an image-data supplying device, and to set desired recording parameters from the image-data supplying device.

Furthermore, according to the present invention, it is possible to set desired recording parameters by key operations of a recording apparatus.

Furthermore, according to the present invention, when a recording apparatus has a plurality of interfaces, desired recording parameters can be set for each of the plurality of interfaces.

Further objects, features and advantages of the present invention will become apparent from the following description of the preferred embodiments with reference to the attached drawings.

DESCRIPTION OF THE PREFERRED EMBODIMENTS

Now, preferred embodiments of the present invention will be described with reference to the accompanying drawings.

Figure 1:
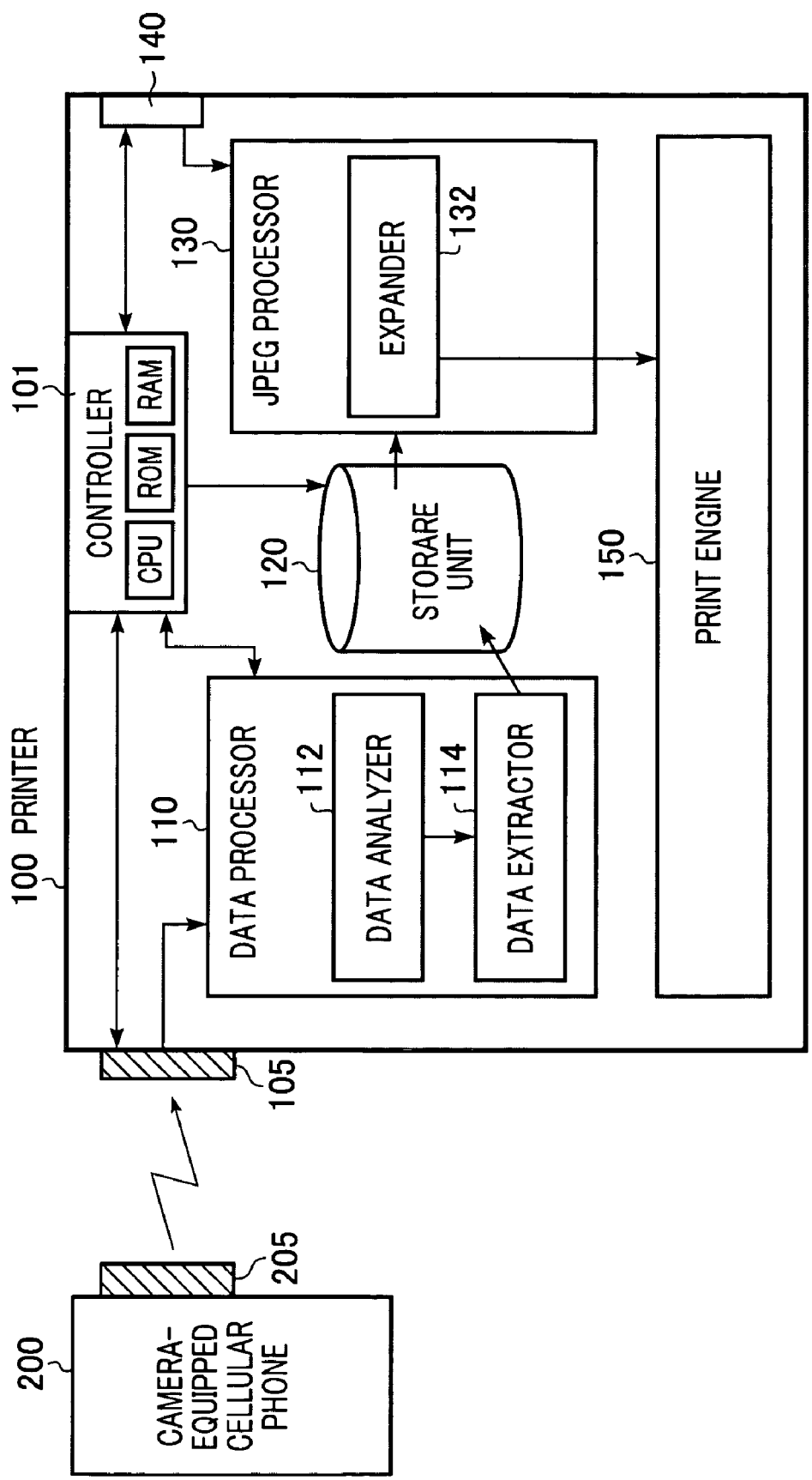
FIG. 1 is a block diagram showing a schematic construction of a printer according to an embodiment of the present invention, and communication with a camera-equipped cellular phone.

FIG. 1 is a block diagram showing a schematic construction of a printer 100 according to an embodiment of the present invention, and communication with a camera-equipped cellular phone 200.

Referring to FIG. 1, the camera-equipped cellular phone 200 has an infrared communication interface 205, and is capable of sending captured image data or the like to an external device via the infrared communication interface 205.

Next, the construction of the printer 100 will be described. The printer 100 has an infrared communication interface 105, and is capable of communicating with the infrared communication interface 205 of the cellular phone 200. In the printer 100, a controller 101 controls the operation of the printer 100. The controller 101 includes a CPU, a ROM storing programs to be executed by the CPU, a RAM that is used as a work area of the CPU and that temporarily stores various data, and other associated devices. A data processor 110 includes a data analyzer 112 and a data extractor 114. The data analyzer 112 analyzes a file (data) received via the infrared communication interface 105. Based on the result of the analysis, the data extractor 114 extracts image data and print setting data described later. The image data and print setting data extracted are stored in a storage unit 120. The image data is decoded by a JPEG processor 130, and the decoded image data is rendered by a renderer 132. The rendered image is supplied to and printed by a print engine 150. Print specifications in this case are determined based on the print setting data stored in the storage unit 120.

A USB interface 140 allows connection of a device such as a personal computer (PC) or a digital camera, so that image data can be received via the USB interface 140 and then printed. It is to be noted that processing in the data processor 110 and the JPEG processor 130 may be executed by software according to control programs of the CPU of the controller 101.

In this embodiment, as an example, the extracted image file is a JPEG file, and the renderer 132 decodes and renders a compressed image file.

The JPEG processor 130 is also capable of enlarging or reducing the image data rendered by the renderer 132 in accordance with a print size of the image data. That is, before supplying the image data to the print engine 150, the JPEG processor 130 converts the size of the image data so that the image data will be accommodated in a specified print size.

First Embodiment

Now, a first embodiment of the present invention will be described. In the first embodiment, a setting file including print parameters is sent from a cellular phone 200 to a printer 100 in the OBEX (Object Exchange) format. When a setting file does not arrive, default print parameters are used for printing. Print parameters are sent in a single file from the cellular phone 200 to the printer 100 via infrared communication interfaces. Print parameters herein include, for example, sheet size, paper type, layout, print quality, image processing method, number of copies, and the like. These print parameters are also used in embodiments described later.

In the first embodiment, when a setting file is received, print parameters included in the setting file are effective only for print data received next to the setting file. Print data received subsequently is printed using default print parameters of the printer 100. When print data, i.e., image data or text data, arrives without a setting file arriving before the print data, the print data is printed using the default print parameters of the printer 100.

Figure 2:
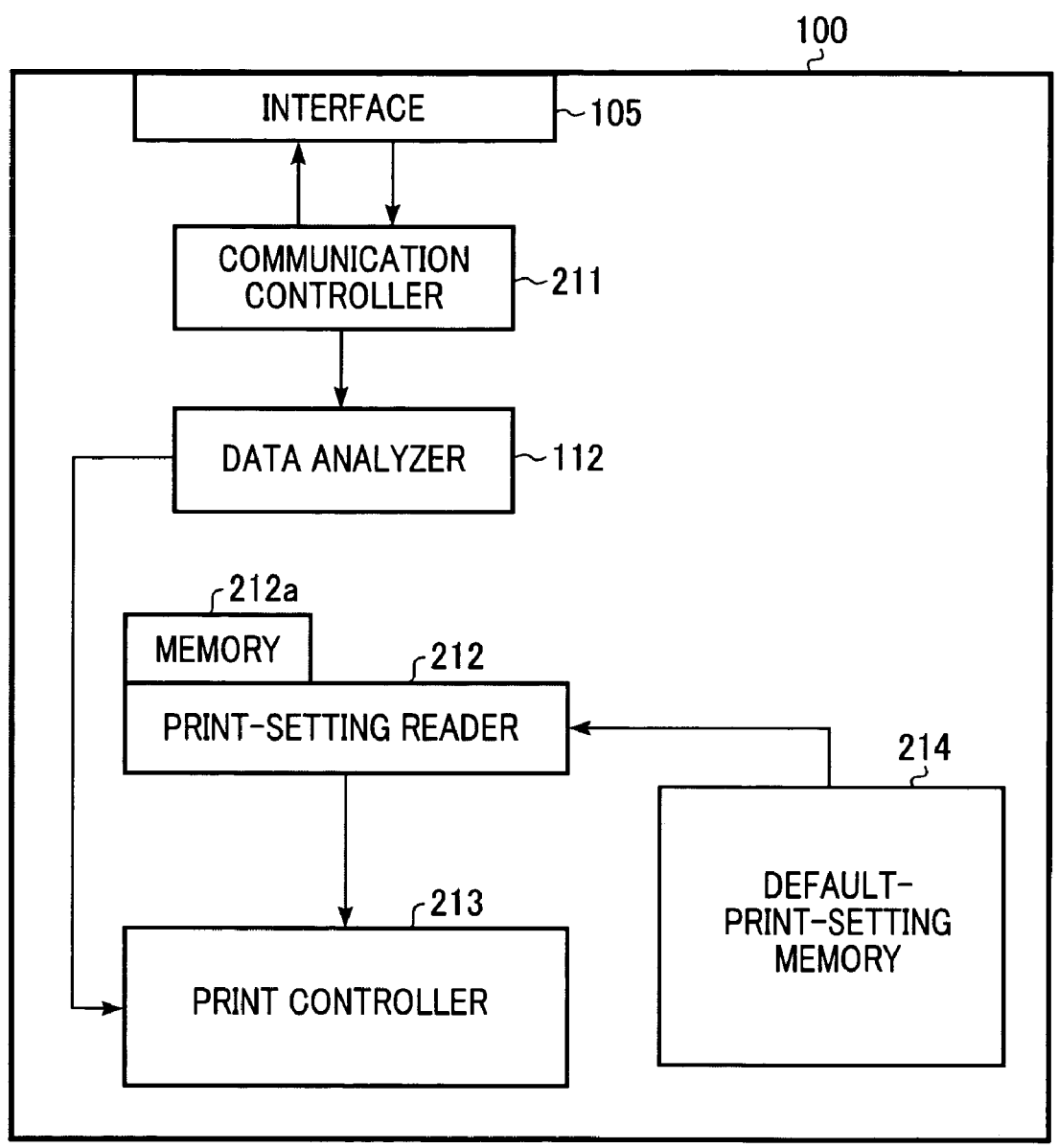
FIG. 2 is a functional block diagram of a printer according to a first embodiment of the present invention.

FIG. 2 is a functional block diagram of the printer 100 in the first embodiment. Parts corresponding to those in FIG. 1 are designated by the same numerals.

Referring to FIG. 2, a communication controller 211 controls infrared wireless communications carried out via the infrared communication interface 105. A print-setting reader 212 reads default print setting stored in a default-print-setting memory 214 and temporarily stores the default print setting in a memory 212a. The print-setting reader 212 sets the print setting stored in the memory 212a to a print controller 213 immediately before a print is started. The data analyzer 112 analyzes data received from the cellular phone 200. If a setting file is included in the data received, the data analyzer 112 sets print parameters of the print controller 213 based on the setting file. The default-print-setting memory 214 is included in the storage unit 120 shown in FIG. 1, and the print controller 213 includes the print engine 150.

Figure 3:
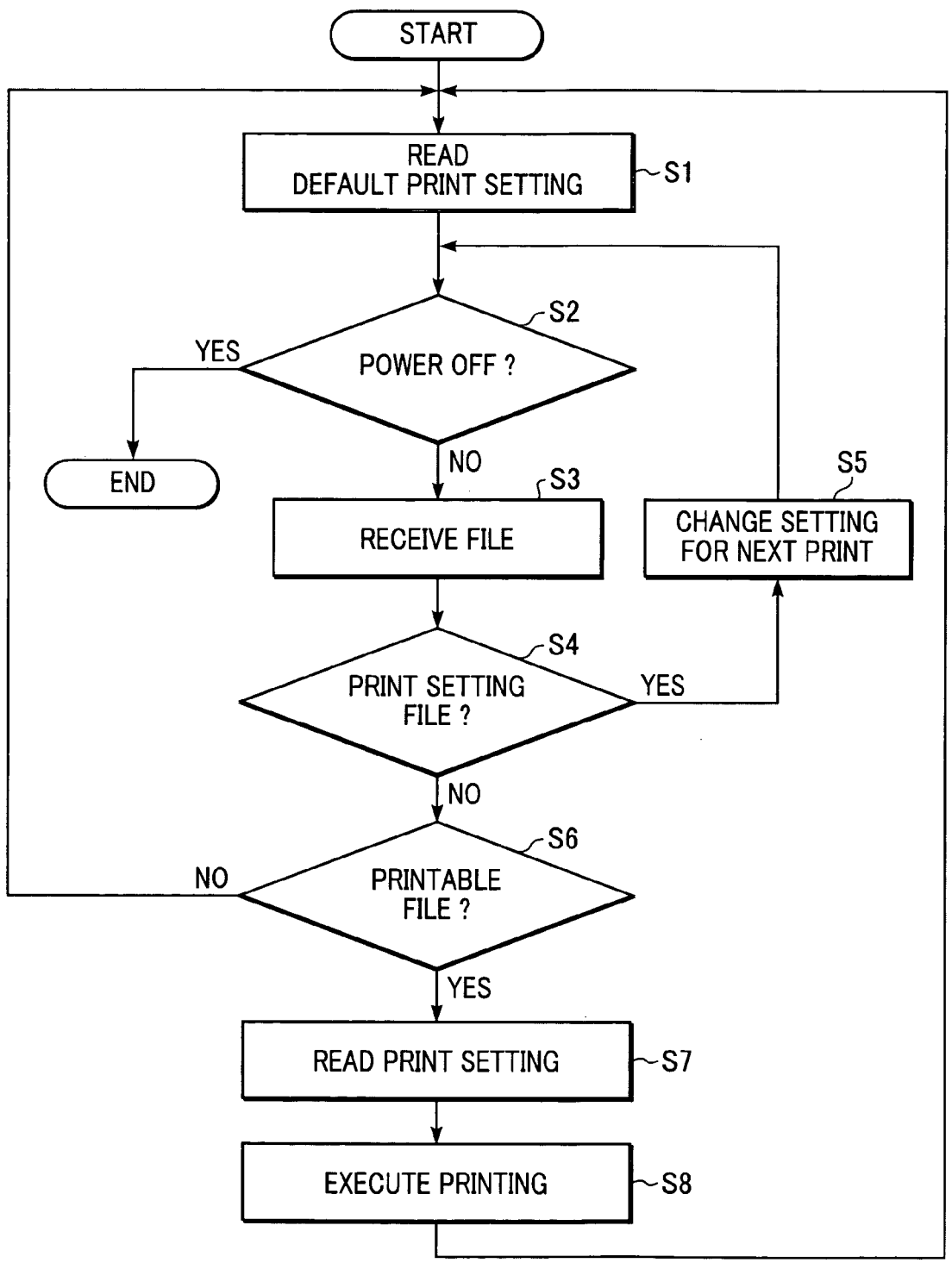
FIG. 3 is a flowchart of a process executed in the printer according to the first embodiment.

FIG. 3 is a flowchart of a process executed in the printer 100 according to the first embodiment. A program for allowing execution of the process is stored in the ROM of the controller 101, and is executed under the control of the CPU.

Referring to FIG. 3, the process starts when the printer 100 is powered on. In step S1, the print-setting reader 212 reads default print setting from the default-print-setting memory 214, and stores the default print setting in the memory 212a of the print-setting reader 212. In step S2, it is checked whether the printer 100 is powered off. If the printer 100 is not powered off, the process proceeds to step S3, in which the communication controller 211 receives a file via the infrared communication interface 105. Then, in step S4, the data analyzer 112 analyzes the content of the file received, and determines whether the file is a print setting file for setting print parameters. If the file is a print setting file, the process proceeds to step S5, in which the print setting specified in the print setting file is temporarily stored in the memory 212a. The process then returns to step S2, and waits for reception of a next file.

If it is determined in step S4 that the file received is not a print setting file, the process proceeds to step S6, in which it is determined whether the file received is a printable file, i.e., an image file or a text file. If the file received is a printable file, the process proceeds to step S7, in which the print setting stored in the memory 212a in step S1 or step S5 is read and set in the print controller 213. The process then proceeds to step S8, in which the print controller 213 executes printing according to the print setting. When printing is finished in the manner described above, the process returns to step S1, in which the print-setting reader 212 reads the default print setting from the default-print-setting memory 214, and writes the default print setting in the memory 212a.

Thus, the print parameters included in the print setting file is used only for printing of print data that is received next to the print setting file. Unless a print setting file is received, the default print setting stored in the default-print-setting memory 214 is used for printing.

Second Embodiment

Now, a second embodiment of the present invention will be described. The second embodiment is basically the same as the first embodiment, but differs in that print parameters once set are effective until a soft power off. When a printer 100 is powered on again after a soft power off, default print parameters stored in the default-print-setting memory 214 of the printer 100 becomes effective.

Figure 4:
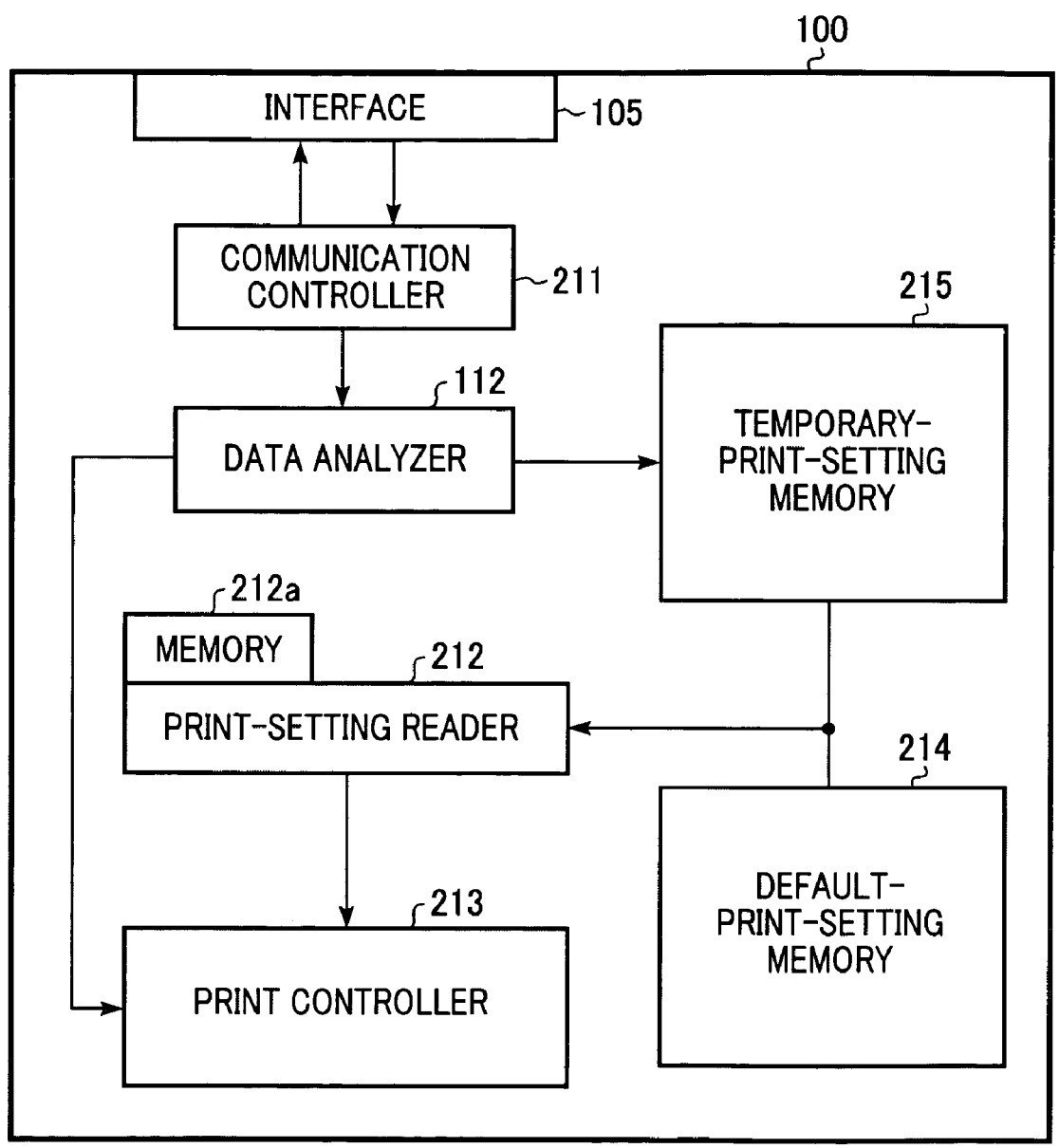
FIG. 4 is a functional block diagram of a printer according to a second embodiment of the present invention.

FIG. 4 is a functional block diagram of a printer 100 according to the second embodiment. Parts corresponding to those in FIG. 1 are designated by the same numerals.

Referring to FIG. 4, when the data analyzer 112 determines that print setting is included in a file received, the print setting is temporarily stored in a temporary-print-setting memory 215. The temporary-print-setting memory 215 and the default-print-setting memory 214 are included in the storage unit 120 shown in FIG. 1.

Figure 5:
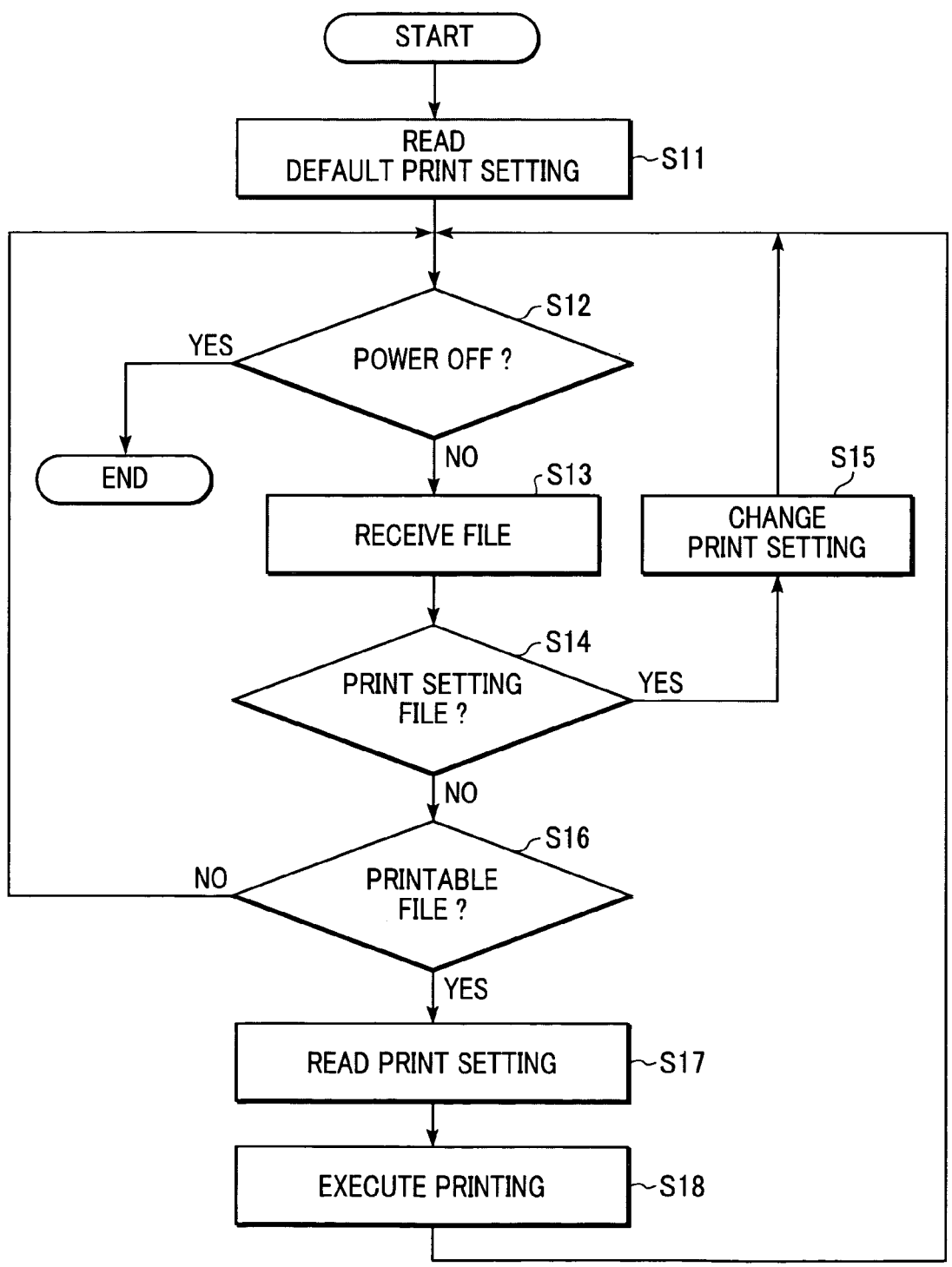
FIG. 5 is a flowchart of a process executed in the printer according to the second embodiment.

FIG. 5 is a flowchart of a process executed in the printer 100 according to the second embodiment. A program for allowing execution of the process is stored in the ROM of the controller 101, and is executed under the control of the CPU.

The process starts when the printer 100 is powered on. In step S11, the print-setting reader 212 reads default print setting from the default-print-setting memory 214, and stores the default print setting in the memory 212a. In step S12, it is checked whether the printer 100 is powered off. If the printer 100 is not powered off, the process proceeds to step S13, in which the communication controller 211 receives a file via the infrared communication interface 105. Then, in step S14, the data analyzer 112 analyzes the content of the file received, and determines whether the file is a print setting file. If the file received is a print setting file, the process proceeds to step S15, in which print setting specified in the print setting file is stored in the temporary-print-setting memory 215. In this case, the content of the memory 212a is also updated to reflect the new print setting. The process then returns to step S12, and waits for reception of a next file.

If it is determined in step S14 that the file received is not a print setting file, the process proceeds to step S16, in which it is determined whether the file is a printable file, i.e., an image file or a text file. If the file received is a printable file, the process proceeds to step S17, in which the print-setting reader 212 reads print setting stored in the memory 212a and sets the print setting in the print controller 213. When step S15 is not executed, i.e., when print setting is not stored in the temporary-print-setting memory 215, the default print setting stored in the memory 212a in step S11 is set in the print controller 213. The process then proceeds to step S18, in which the print controller 213 executes printing according to the print setting made in step S17. The process then returns to step S12, and waits for reception of a next file. Also, if it is determined in step S16 that the file received is not a printable file, the process returns to step S12, and waits for reception of a next file.

Thus, the print parameters included in the print setting file received from the cellular phone 200 are effective for printing until a soft power off.

Third Embodiment

Now, a third embodiment of the present invention will be described. The third embodiment is basically the same as the first embodiment, but differs in that print parameters once set are effective until print parameters are set next time. When a printer 100 is once powered off and is then powered on again, default print parameters stored in the default-print-setting memory 214 of the printer 100 become effective.

Figure 6:
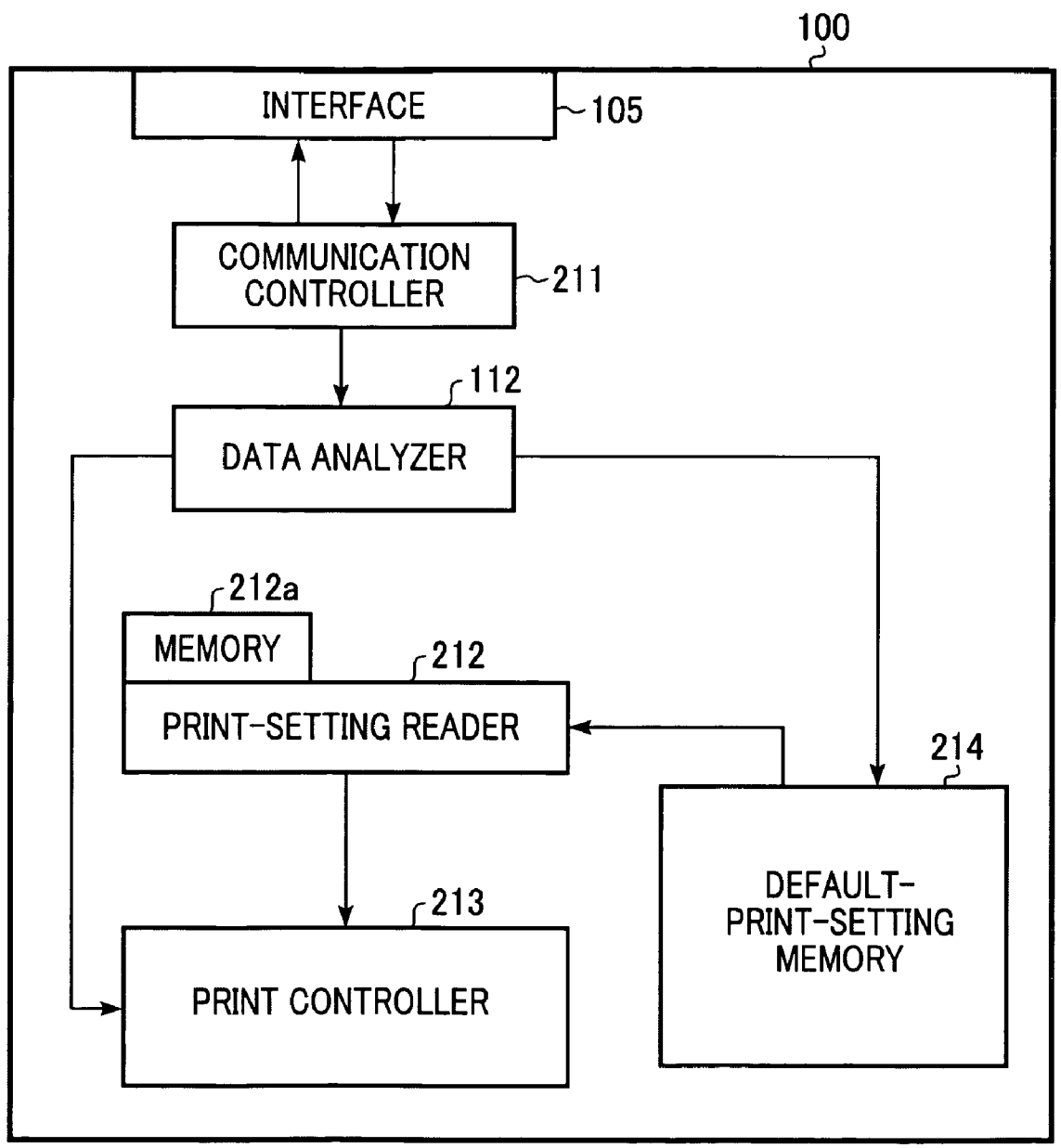
FIG. 6 is a functional block diagram of a printer according to a third embodiment of the present invention.

FIG. 6 is a functional block diagram of a printer 100 according to the third embodiment. Parts corresponding to those in FIG. 1 are designated by the same numerals.

Referring to FIG. 6, when print setting is included in a file received, the data analyzer 112 stores the print setting in the default-print-setting memory 214. The default-print-setting memory 214 is included in the storage unit 120 shown in FIG. 1.

Figure 7:
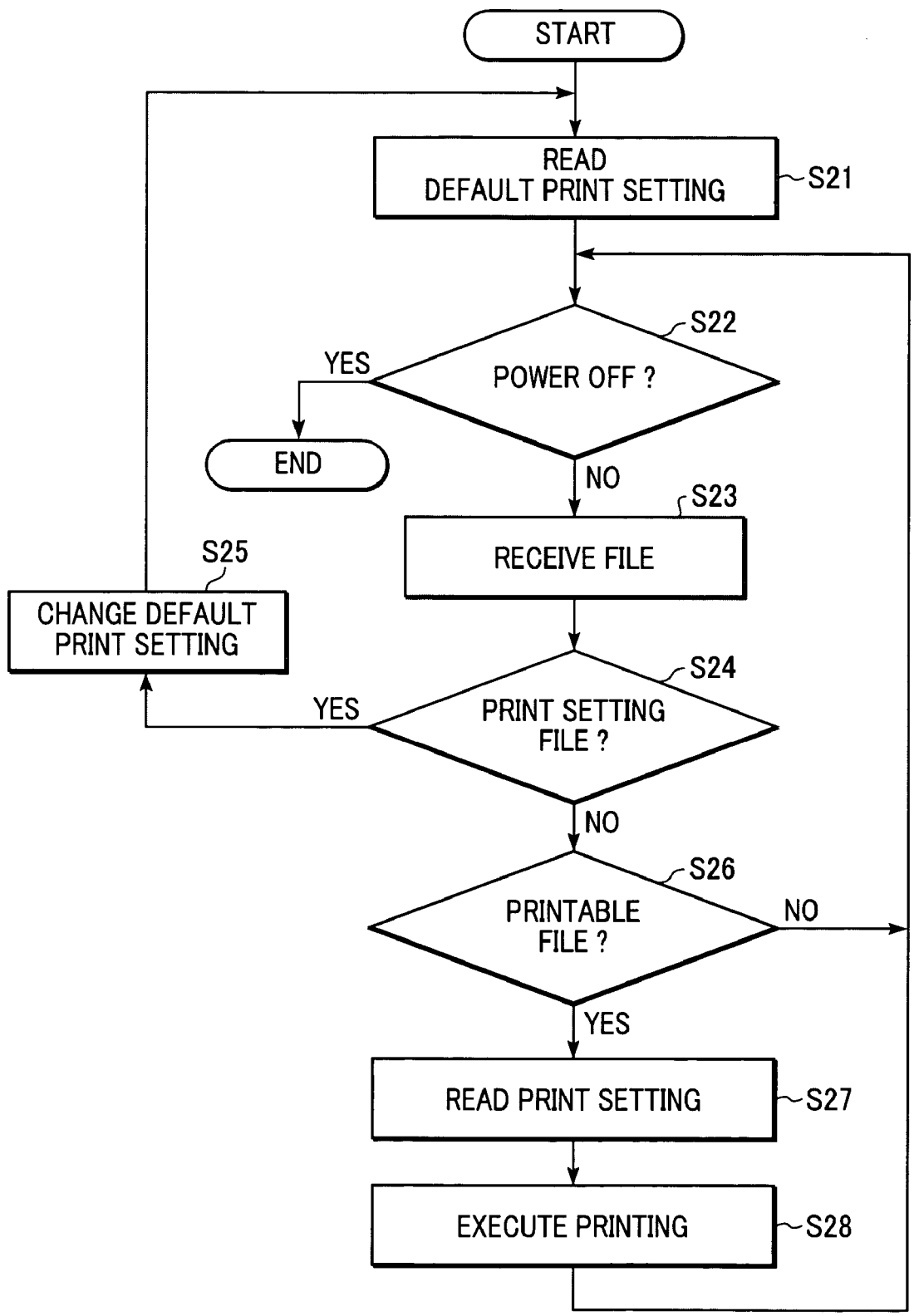
FIG. 7 is a flowchart of a process executed in the printer according to the third embodiment.

FIG. 7 is a flowchart of a process executed in the printer 100 according to the third embodiment. A program for allowing execution of the process is stored in the ROM of the controller 101, and is executed under the control of the CPU.

Referring to FIG. 7, the process starts when the printer 100 is powered on. In step S21, the print-setting reader 212 reads default print setting from the default-print-setting memory 214, and stores the default print setting in the memory 212a. In step S22, it is checked whether the printer 100 is powered off. If the printer 100 is not powered off, the process proceeds to step S23, in which the communication controller 211 receives a file via the infrared communication interface 105. The process then proceeds to step S24, in which the data analyzer 112 analyzes the content of the file received, and determines whether the file is a print setting file. If the file received is a print setting file, the process proceeds to step S25, in which print setting specified in the print setting file is stored in the default-print-setting memory 214. The process then returns to step S21.

If it is determined in step S24 that the file received is not a print setting file, the process proceeds to step S26, in which it is determined whether the file is a printable file, i.e., an image file or a text file. If the file received is a printable file, the process proceeds to step S27, in which print setting stored in the memory 212a, i.e., the print setting stored in the default-print-setting memory 214 in this case, is set in the print controller 213. The process then proceeds to step S28, in which the print controller 213 executes printing according to the print setting. The process then returns to step S21, and waits for reception of a next file. If it is determined in step S26 that the file received is not a printable file, the process returns to step S22, and waits for reception of a next file.

Thus, when a print setting file is once received, the print setting is effective for printing until a next print setting file is received.

Fourth Embodiment

Now, a fourth embodiment of the present invention will be described. In the fourth embodiment, one of the schemes according to the first to third embodiments is used selectively based on a setting command received.

Figure 8:
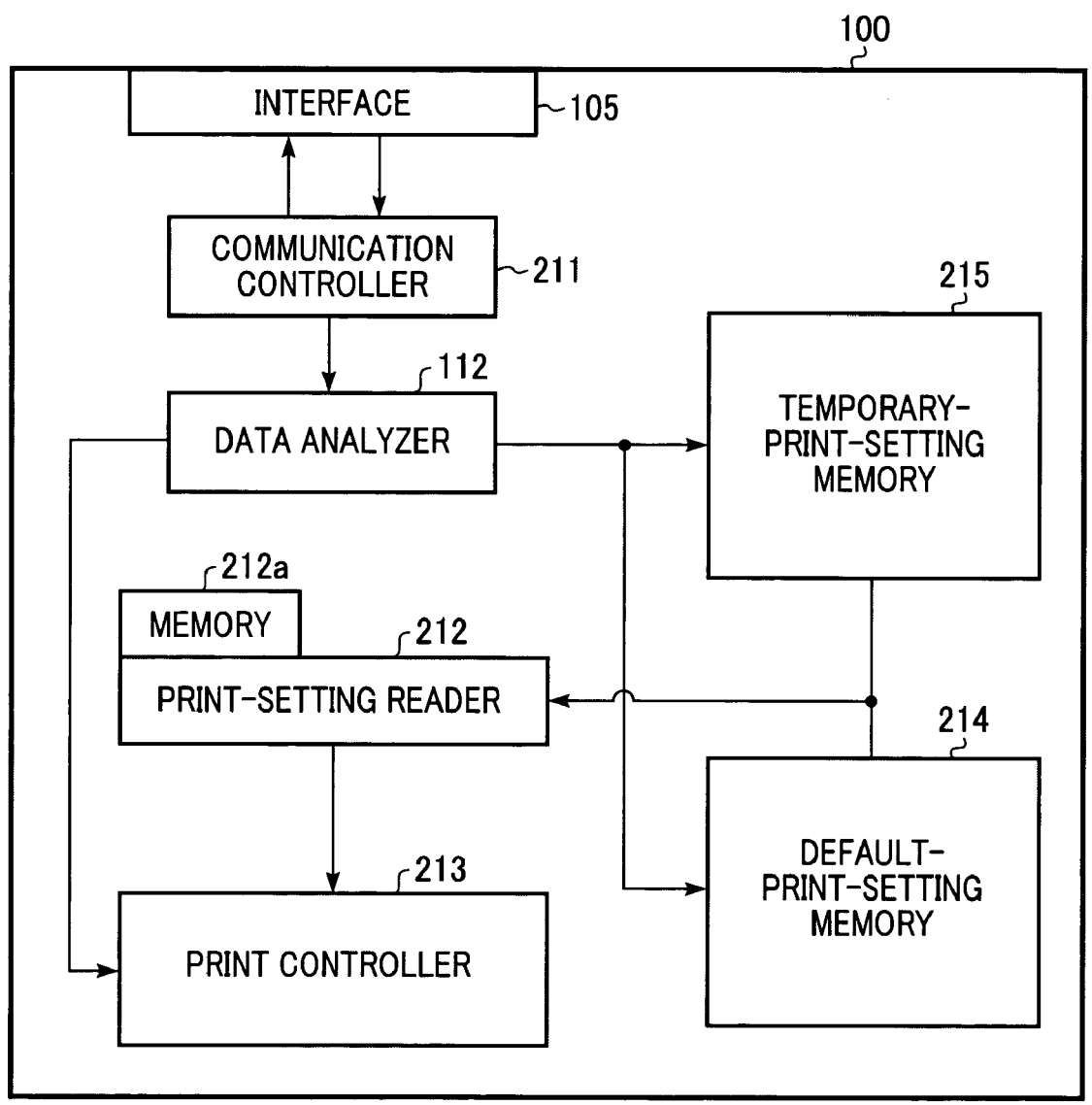
FIG. 8 is a functional block diagram of a printer according to a fourth embodiment of the present invention.

FIG. 8 is a functional block diagram of a printer 100 according to the fourth embodiment. Parts corresponding to those in FIG. 4 are designated by the same numerals.

Referring to FIG. 8, when print setting is included in a file received, the data analyzer 112, based on data attached to the print setting, determines whether to store the print setting in the temporary-print-setting memory 215 or the default-print-setting memory 214, and stores the print setting accordingly.

Figure 9:
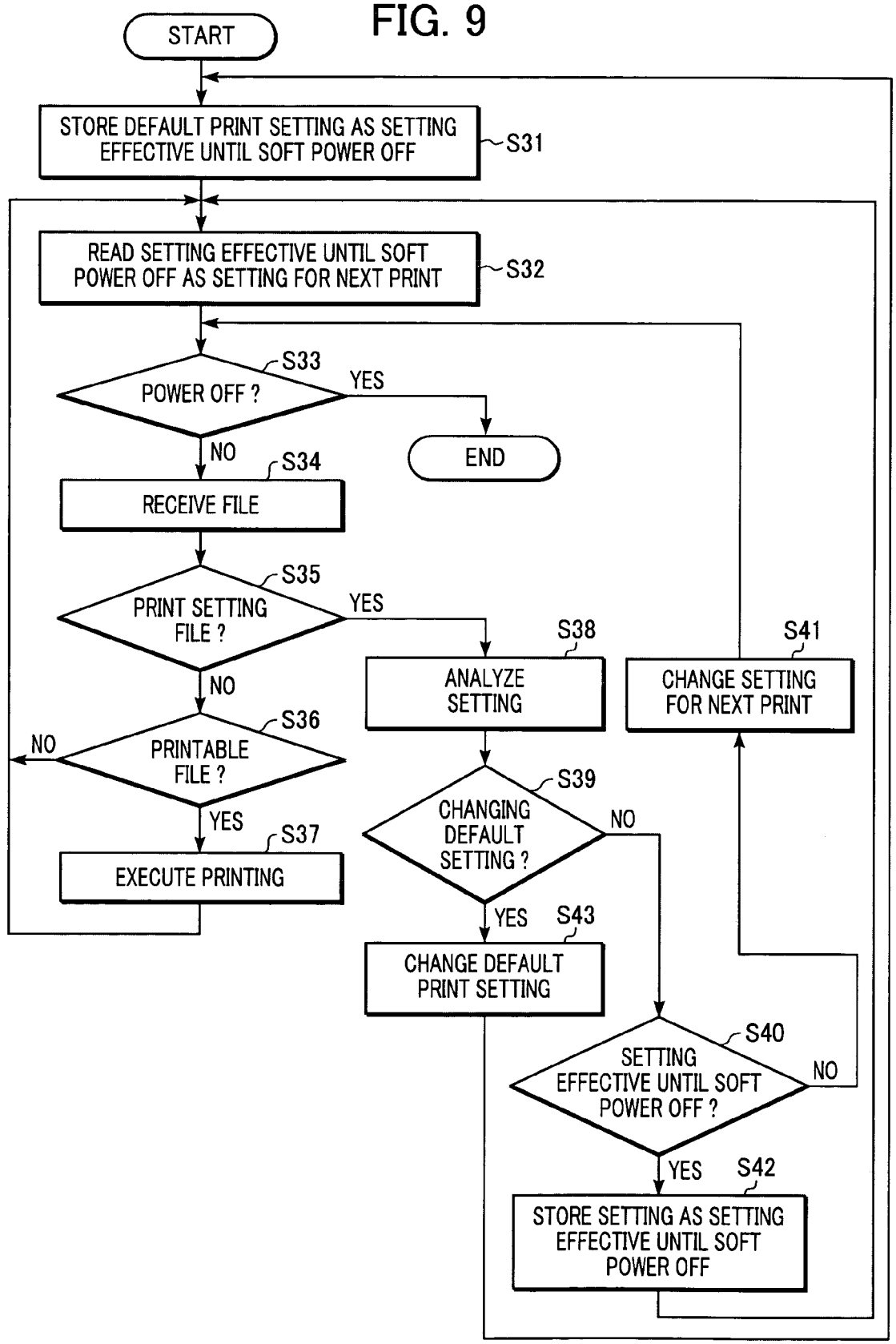
FIG. 9 is a flowchart of a process executed in the printer according to the fourth embodiment.

FIG. 9 is a flowchart of a process executed in the printer 100 according to the fourth embodiment. A program for allowing execution of the process is stored in the ROM of the controller 101, and is executed under the control of the CPU.

Referring to FIG. 9, the process starts when the printer 100 is powered on. In step S31, the print-setting reader 212 registers print setting stored in the default-print-setting memory 214 to the temporary-print-setting memory 215. The process then proceeds to step S32, in which the print-setting reader 212 reads the print setting from the temporary-print-setting memory 215, and stores the print setting in the memory 212a. Then, in step S33, it is checked whether the printer 100 is powered off. If the printer 100 is not powered off, the process proceeds to step S34, in which the communication controller 211 receives a file via the infrared communication interface 105. Then, in step S35, the data analyzer 112 analyzes the content of the file received, and determines whether the file is a print setting file. If the file received is not a print setting file, the process proceeds to step S36, in which it is determined whether the file is a printable file, i.e., an image file or a text file. If the file received is a printable file, the process proceeds to step S37, in which print parameters are set in the print controller 213 according to the print setting stored in the memory 212a, and the print controller 213 executes printing according to the print setting. The process then returns to step S32. The content of the memory 212a is the print setting read from the temporary-print-setting memory 215.

If it is determined in step S35 that the file received is a print setting file, the process proceeds to step S39, in which it is determined whether the setting command received requests changing the default print setting. If so, the process proceeds to step S43, in which the print setting stored in the default-print-setting memory 214 is changed. The process then returns to step S31. If it is determined in step S39 that the setting command does not request changing the default print setting, the process proceeds to step S40, in which it is determined whether the setting command requests changing setting that is effective until a soft power off. If so, the process proceeds to step S42, in which the content of the temporary-print-setting memory 215 is changed. The process then returns to step S32, and waits for reception of a next file. If it is determined in step S40 that the print setting is effective only for a next file, the print-setting reader 212 changes the content of the memory 212a to the default print setting. The process then proceeds to step S33, and waits for reception of a next file.

As described above, according to the fourth embodiment, print setting received can be stored as default print setting or temporary print setting, and the effective period of the print setting received can be switched accordingly.

Fifth Embodiment

Now, a fifth embodiment of the present invention will be described. According to the fifth embodiment, print parameters can be set at a printer 100 by operating keys on an operation panel of the printer 100.

Figure 10:
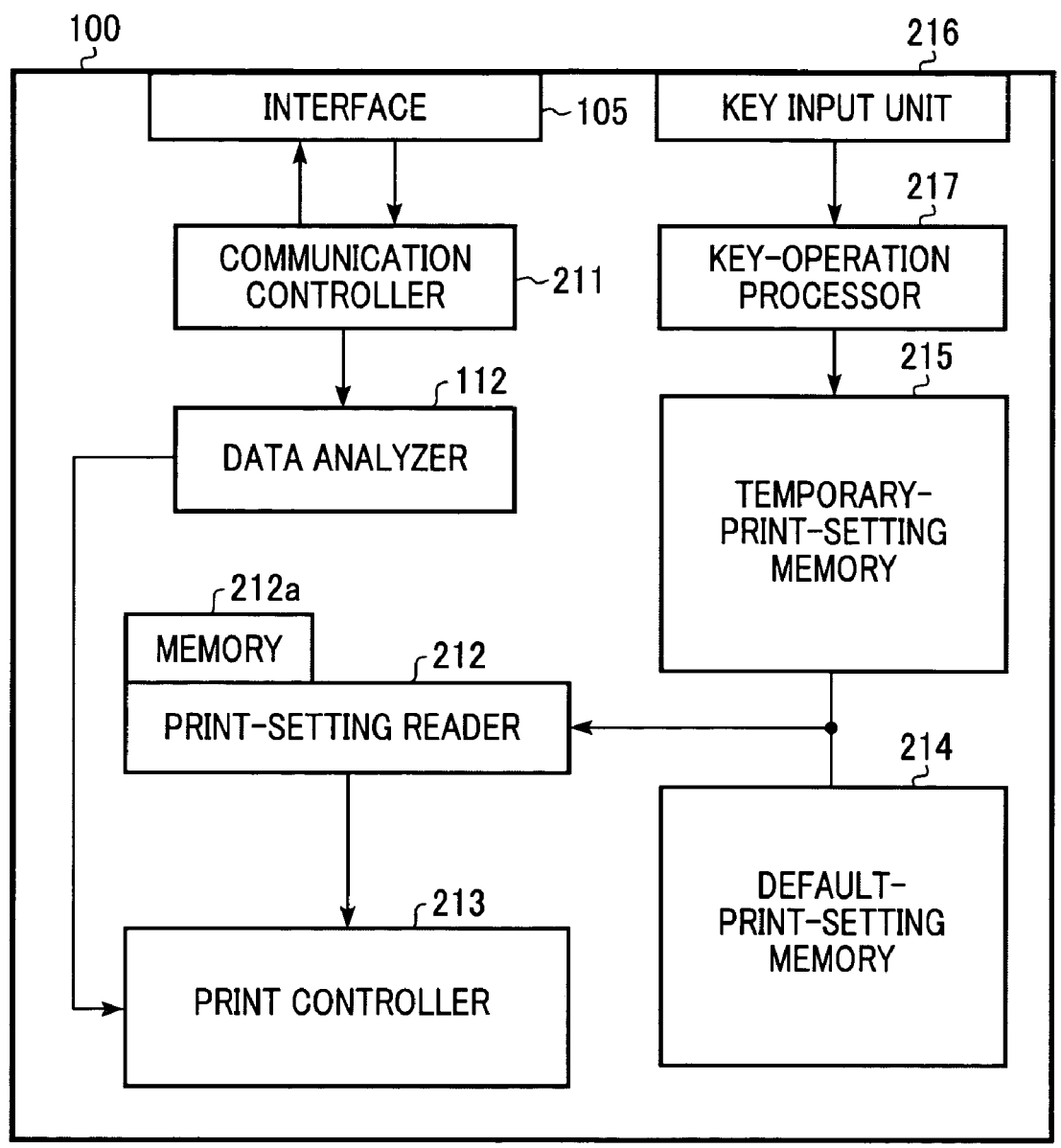
FIG. 10 is a functional block diagram of a printer according to a fifth embodiment of the present invention.

FIG. 10 is a functional block diagram of a printer 100 according to the fifth embodiment. In FIG. 10, parts corresponding to those in FIG. 8 are designated by the same numerals.

Referring to FIG. 10, a key input unit 216 corresponds to the operation keys of the operation panel of the printer 100. A key-operation processor 217 creates print setting by recognizing key operations on the key input unit 216, and stores the print setting in the temporary-print-setting memory 215. In the fifth embodiment, print setting once made is only effective for next print data. For print data received subsequently, default print setting stored in the default-print-setting memory 214 of the printer 100 is used. When image data or text data is received without a setting operation performed, the default print setting of the printer 100 is used for printing.

Print setting by key operations on the operation panel of the printer 100 will be described later in detail with reference to FIG. 19.

Figure 11:
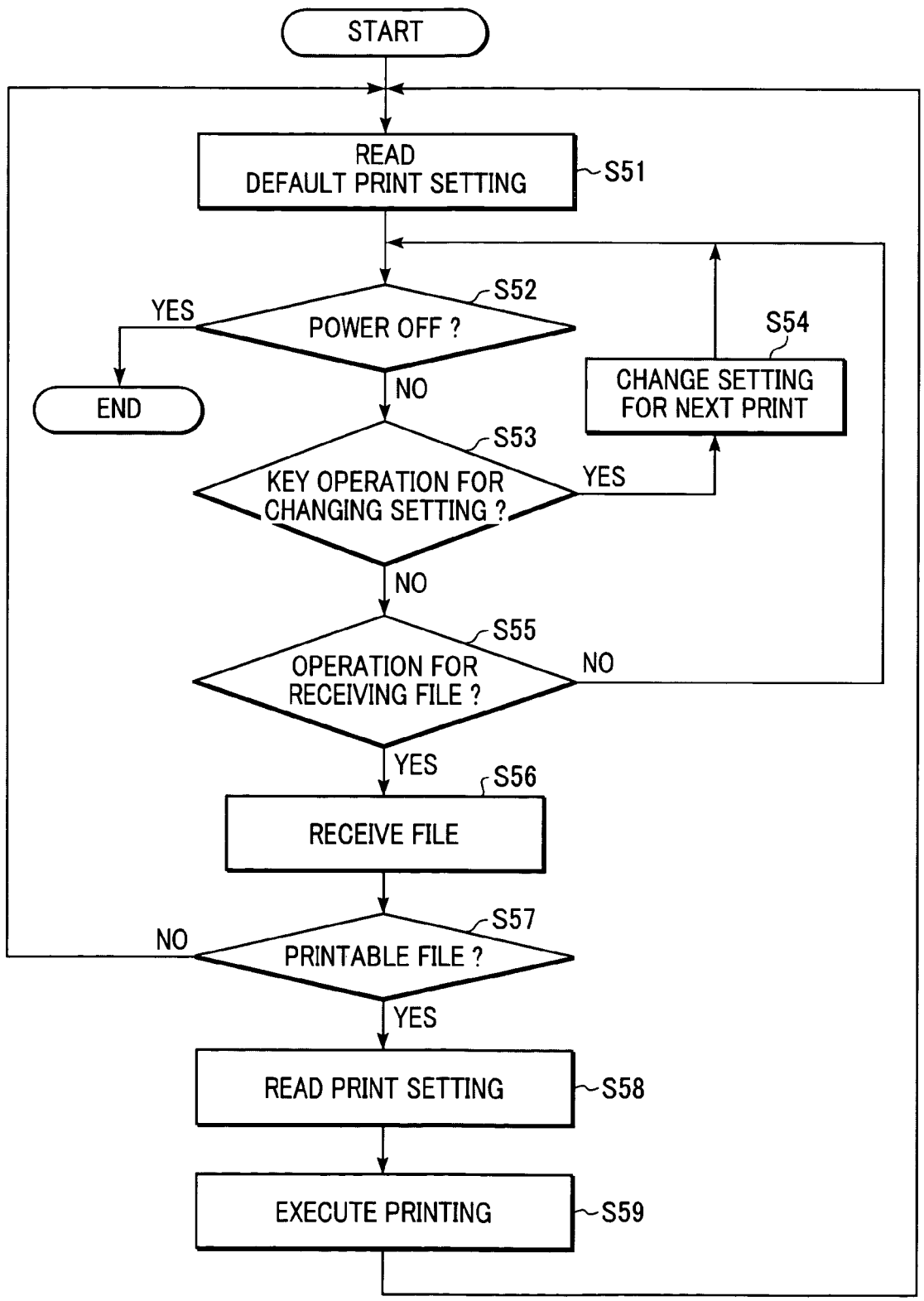
FIG. 11 is a flowchart of a process executed in the printer according to the fifth embodiment.

FIG. 11 is a flowchart of a process executed in the printer 100 according to the fifth embodiment. A program for allowing execution of the process is stored in the ROM of the controller 101, and is executed under the control of the CPU.

The process starts when the printer 100 is powered on. In step S51, the print-setting reader 212 reads print setting stored in the default-print-setting memory 214, and stores the print setting in the memory 212a. In step S52, it is checked whether the printer 100 is powered off. If the printer 100 is not powered off, the process proceeds to step S53, in which the key-operation processor 217 determines whether a key operation has been performed via the key input unit 216 and whether the key operation requests changing print setting. If the key operation requests changing print setting, the process proceeds to step S54, in which print setting stored in the temporary-print-setting memory 215 is changed and the content of the memory 212a is updated.

If it is determined in step S53 that the key operation does not request changing print setting, the process proceeds to step S55, in which the ongoing operation involves receiving a file. If it is determined in step S55 that the ongoing operation does not involve receiving a file, the process returns to step S52. On the other hand, if it is determined in step S55 that the ongoing operation involves receiving a file, the process proceeds to step S56, in which reception of a file is executed. Then, the process proceeds to step S57, in which the data analyzer 112 determines whether the file received is a printable file. If the file received is a printable file, the process proceeds to step S58, in which the print-setting reader 212 reads print setting stored in the memory 212a, and sets the print setting in the print controller 213. The process then proceeds to step S59, in which the print controller 213 executes printing. When printing is finished in the manner described above, or when it is determined in step S57 that the file received is not a printable file, the process returns to step S51, in which the print-setting reader 212 reads the print setting stored in the default-print-setting memory 214, and stores the print setting in the memory 212a.

As described above, according to the fifth embodiment, print setting can be made by key operations, and the print setting is applied only to print data received next to execution of the print setting.

Sixth Embodiment

Now, a sixth embodiment of the present invention will be described. In the sixth embodiment, print parameters can be set at a printer 100 by operating keys on an operation panel of the printer, as in the fifth embodiment. The functional configuration of a printer 100 according to the sixth embodiment is not shown since it the same as the functional configuration shown in FIG. 10. In the sixth embodiment, print setting once made is effective until a soft power off. In the sixth embodiment, print setting made by key operations is effective not only for next image or text data but also for subsequent image or text data. When the printer 100 is powered on again after a soft power off, default print setting of the printer 100 becomes effective.

Figure 12:
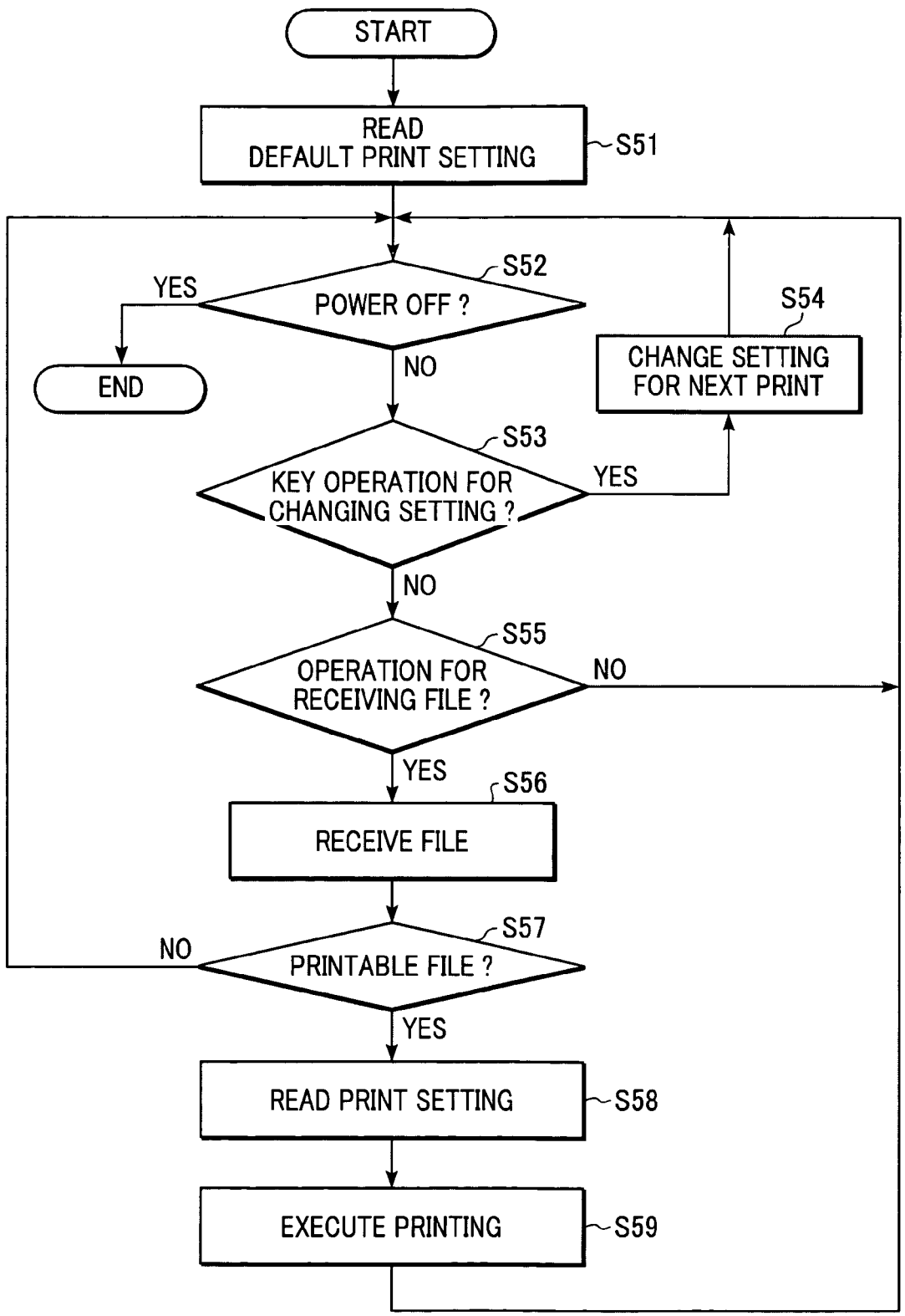
FIG. 12 is a flowchart of a process executed in a printer according to a sixth embodiment of the present invention.

FIG. 12 is a flowchart of a process executed in the printer 100 according to the sixth embodiment. A program for allowing execution of the process is stored in the ROM of the controller 101, and is executed under the control of the CPU. In FIG. 12, steps corresponding to those in FIG. 11 are designated by the same numerals, and descriptions thereof will be omitted.

As is apparent from a comparison between FIG. 12 and FIG. 11, in FIG. 12, steps S54, S55, S57, and S59 return to step S52. Thus, print parameters set in the print controller 213 are not changed until new print parameters are set.

Seventh Embodiment

Now, a seventh embodiment of the present invention will be described. In the seventh embodiment, print parameters can be set at a printer 100 by operating keys on an operation panel of the printer 100. The seventh embodiment differs from the sixth embodiment in that print setting once made is effective until print setting is made next time. That is, when print setting is once made, the print setting is effective not only for next image or text data but also for subsequent image or text data. Furthermore, the print setting is effective even when the printer 100 is once powered off and is then powered on. Print setting is changed, however, when new print setting is made or when default print parameters are changed.

Figure 13:
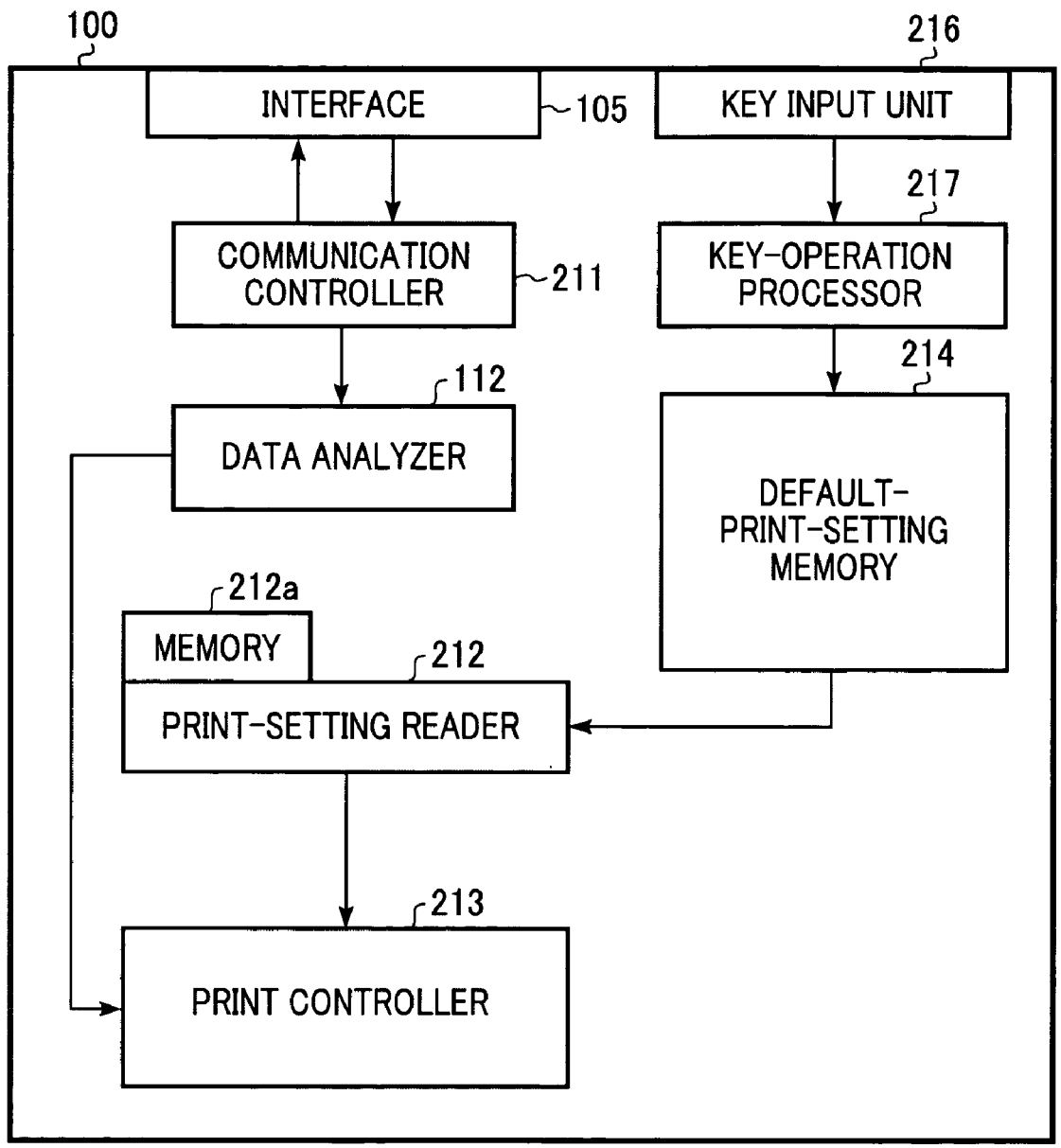
FIG. 13 is a functional block diagram of a printer according to a seventh embodiment of the present invention.

FIG. 13 is a functional block diagram of a printer 100 according to the seventh embodiment. In FIG. 13, parts corresponding to those in FIG. 10 are designated by the same numerals.

Referring to FIG. 13, the key-operation processor 217 creates print setting by recognizing key operations on the key input unit 216, and stores the print setting in the default-print-setting memory 214.

Figure 14:
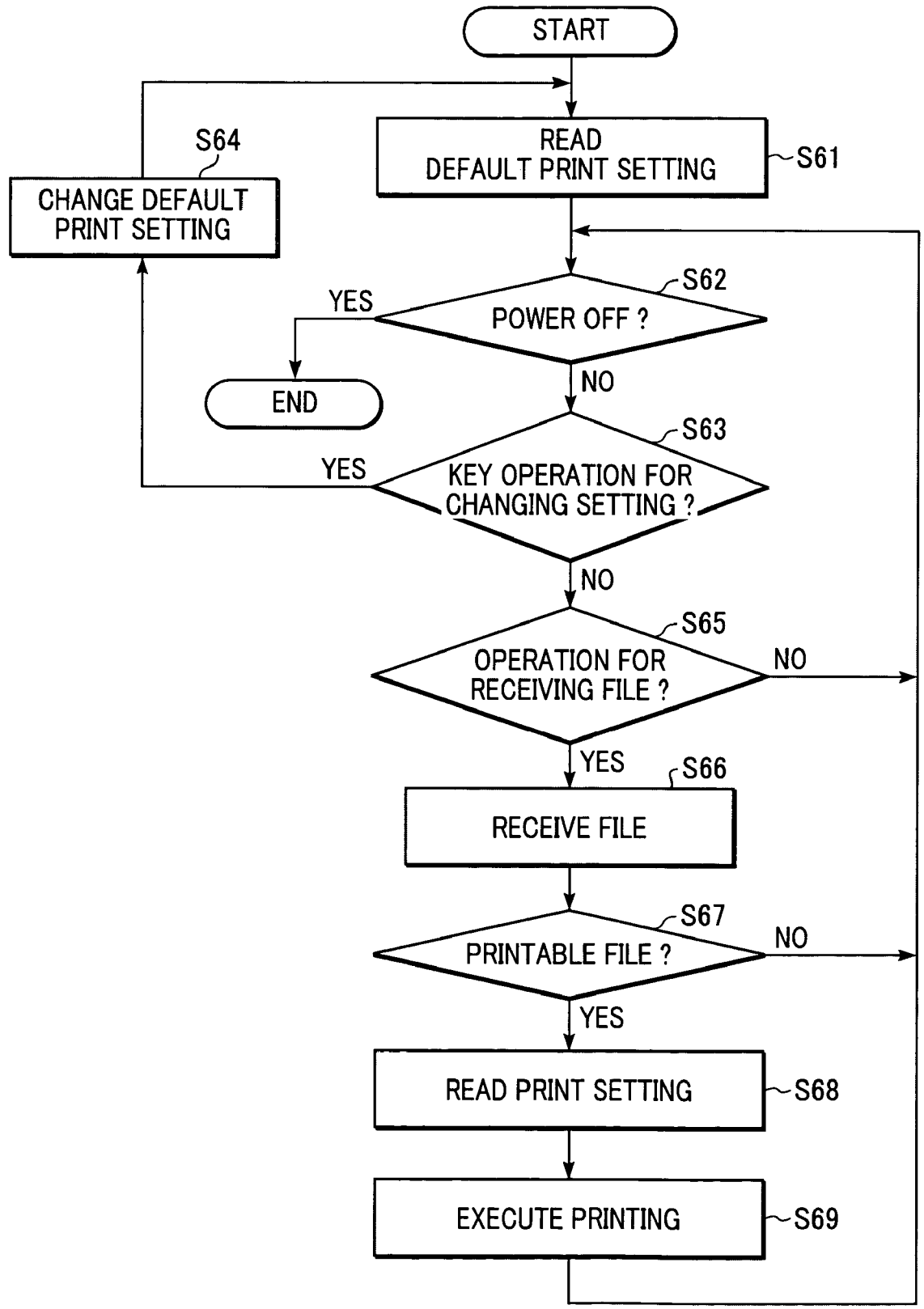
FIG. 14 is a flowchart of a process executed in the printer according to the seventh embodiment.

FIG. 14 is a flowchart of a process executed in the printer 100 according to the seventh embodiment. A program for allowing execution of the process is stored in the ROM of the controller 101, and is executed under the control of the CPU.

The process starts when the printer 100 is powered on. In step S61, the print-setting reader 212 reads print setting stored in the default-print-setting memory 214, and stores the print setting in the memory 212*a*. In step S62, it is checked whether the printer 100 is powered off. If the printer 100 is not powered off, the process proceeds to step S63, in which the key-operation processor 217 determines whether a key operation has been performed via the key input unit 216 and whether the key operation requests changing print setting. If so, the process proceeds to step S64, in which print setting stored in the default-print-setting memory 214 is changed. The process then returns to step S61, and the content of the memory 212*a* is also updated to reflect the new print setting.

If it is determined in step S63 that the key operation does not request changing print setting, the process proceeds to step S65, in which it is determined whether the ongoing operation involves receiving a file. If it is determined in step S65 that the ongoing operation does not involve receiving a file, the process returns to step S62. On the other hand, if it is determined in step S65 that the ongoing operation involves receiving a file, the process proceeds to step S66, in which reception of a file is executed. Then, the process proceeds to step S67, in which the data analyzer 112 determines whether the file received is a printable file. If the file received is a printable file, the process proceeds to step S68, in which the print-setting reader 212 reads print setting stored in the memory 212*a*, and sets the print setting in the print controller 213. The process then proceeds to step S69, in which the print controller 213 executes printing. When printing is finished in the manner described above, the process returns to step S62, in which it is determined whether print setting is to be performed. Then, the process described above is executed.

As described above, according to the seventh embodiment, when print setting is once made, the print setting is effective not only for next image or text data but also for subsequent image or text data. Furthermore, the setting is effective even when the printer 100 is once powered off and is then powered on again.

Eighth Embodiment

Now, an eighth embodiment of the present invention will be described. In the eighth embodiment, print parameters can be set at a printer 100 by operating keys on an operation panel of the printer 100. Furthermore, it is possible to choose by a key operation whether the print setting is to be effective only for next print data, the print setting is to be effective until a soft power off, or default print setting is to be changed.

Figure 15:
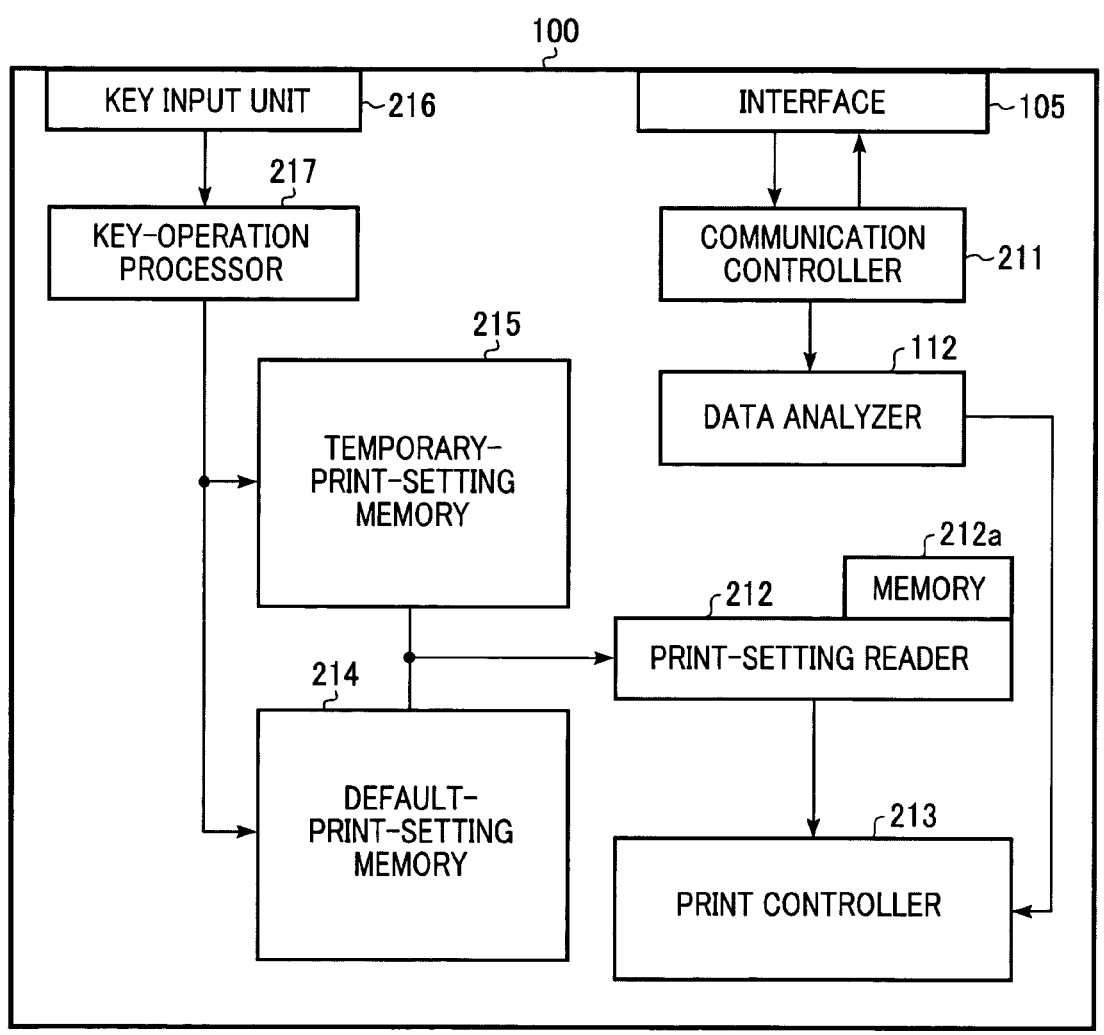
FIG. 15 is a functional block diagram of a printer according to an eighth embodiment of the present invention.

FIG. 15 is a functional block diagram of a printer 100 according to the eighth embodiment. In FIG. 15, parts corresponding to those in the embodiments described above are designated by the same numerals. In the eighth embodiment, the key-operation processor 217 determines according to a key operation whether print setting is to be stored in the temporary-print-setting memory 215 or the default-print-setting memory 214.

Figure 16:
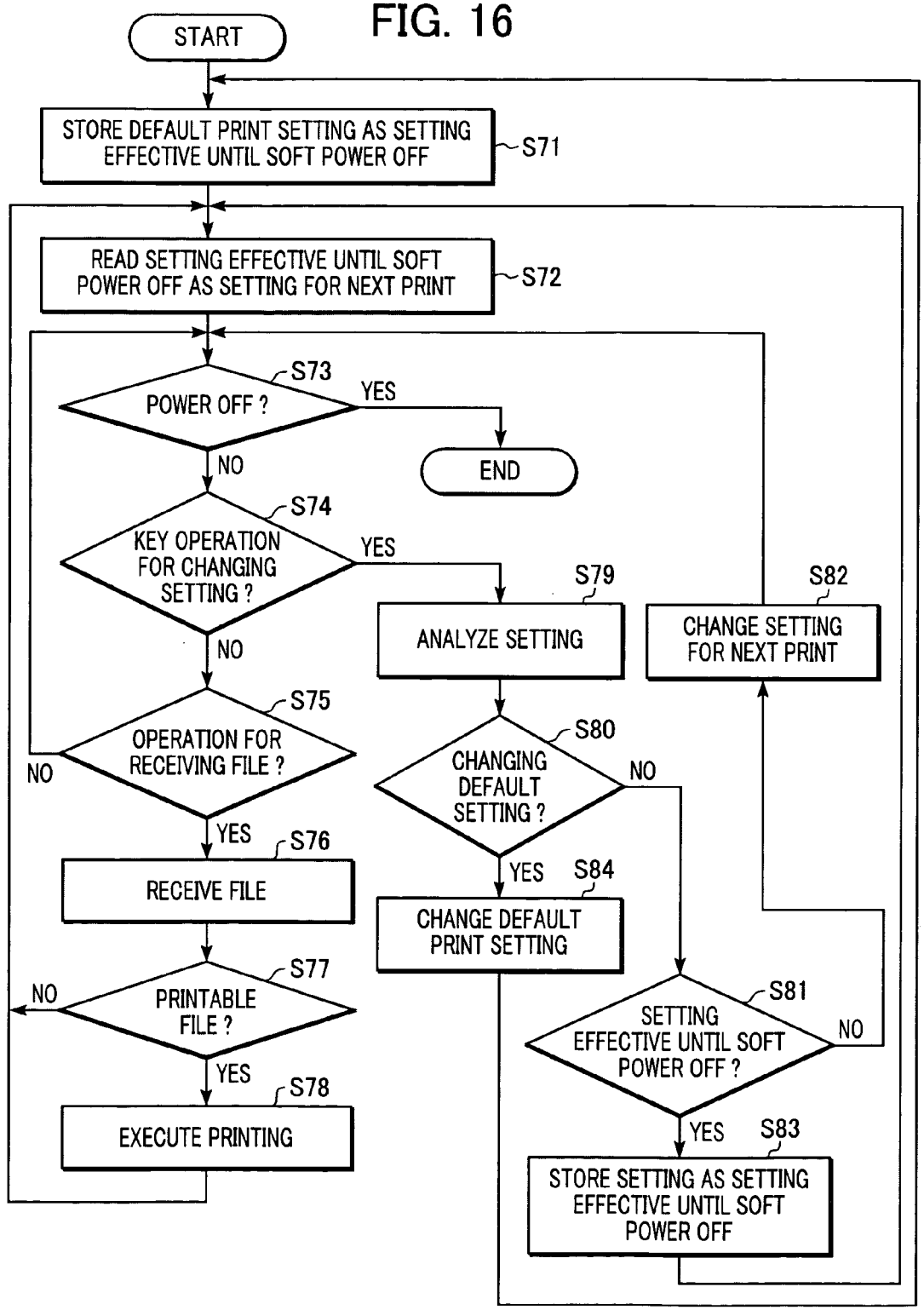
FIG. 16 is a flowchart of a process executed in the printer according to the eighth embodiment.

FIG. 16 is a flowchart of a process executed by the printer 100 according to the eighth embodiment. A program for allowing execution of the process is stored in the ROM of the controller 101, and is executed under the control of the CPU.

The process starts when the printer 100 is powered on. In step S71, the print-setting reader 212 reads print setting stored in the default-print-setting memory 214, and registers the print setting in the temporary-print-setting memory 215. The process then proceeds to step S72, in which the print-setting reader 212 reads print setting from the temporary-print-setting memory 215, and stores the print setting in the memory 212*a*. In step S73, it is checked whether the printer 100 is powered off. If the printer 100 is not powered off, the process proceeds to step S74, in which the key-operation processor 217 determines whether the key operation requests changing print setting based on key input from the key input unit 216. If so, the process proceeds to step S79. Otherwise, the process proceeds to step S75, in which it is determined whether the ongoing operation involves receiving a file. If it is determined in step S75 that the ongoing operation does not involve receiving a file, the process returns to step S73. On the other hand, if it is determined in step S75 that the ongoing operation involves receiving a file, the process proceeds to step S76, in which reception of a file is executed. The process then proceeds to step S77, in which it is determined whether the file received is a printable file. If the file received is a printable file, the process proceeds to step S78, in which print parameters are set in the print controller 213 according to the print setting stored in the memory 212*a* and printing is executed.

In step S79, the content of the key operation is analyzed. Then, in step S80, it is determined whether the key operation requests changing default print setting. If so, the process proceeds to step S84, in which print setting stored in the default-print-setting memory 214 is changed. The process then returns to step S71.

If the key operation does not request changing default setting, the process proceeds to step S81, in which it is determined whether the key operation requests changing setting that is effective until a soft power off. If so, the process proceeds to step S83, in which print setting stored in the temporary-print-setting memory 215 is changed. The process then returns to step S72. If it is determined in step S81 that the key operation requests changing setting that is effective only for a next file, the process proceeds to step S82, in which the print setting is stored in the memory 212*a* of the print-setting reader 212. The process then returns to step S73, and waits for a next operation.

Thus, it is possible to choose by a key operation whether the print setting is to be effective only for next print data, the print setting is to be effective until a soft power off, or default print setting is to be changed.

Ninth Embodiment

Now, a ninth embodiment of the present invention will be described. In the ninth embodiment, a plurality of interfaces is provided, and print setting can be made individually for each of the interfaces. That is, in a multi-interface printer having a plurality of interfaces, print setting can be stored individually for each of the interfaces. For example, in a printer having a USB interface and an IrDA interfaces, print setting for the USB interface and print setting for the IrDA interface are both allowed. Similarly to the embodiments described above, print setting herein include, for example, sheet size, paper type, layout, print quality, image processing method, number of copies, and the like.

The effective period of the print setting and the method of changing the print setting are the same as in the embodiments described above.

Figure 17:
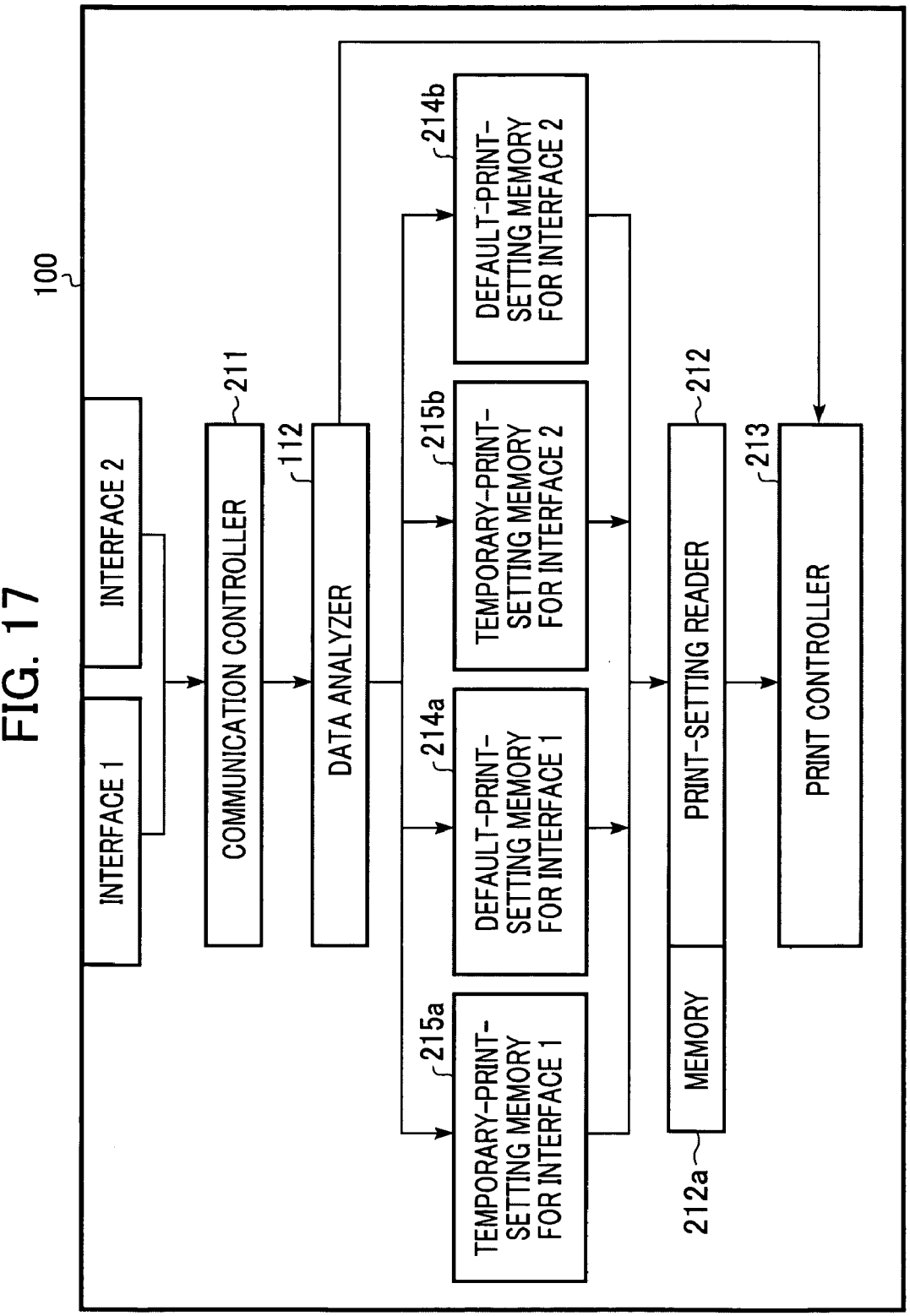
FIG. 17 is a functional block diagram of a printer according to a ninth embodiment of the present invention.

FIG. 17 is a functional block diagram of a printer 100 according to the ninth embodiment. In FIG. 17, parts corresponding to those in the embodiments described above are designated by the same numerals. The printer 100 has a first interface that is used for infrared communications, and a second interface for that is used for USB communications. The printer 100 includes a temporary-print-setting memory 215a for the infrared communication interface, and a default-print-setting memory 214a for the infrared communication interface. The printer 100 also includes a temporary-print-setting memory 215b for the USB interface, and a default-print-setting memory 214b for the USB interface.

Tenth Embodiment

Now, a tenth embodiment of the present invention will be described. In the tenth embodiment, a plurality of interfaces is provided, and print setting can be made individually for the interfaces through the respective interfaces. That is, in a multi-interface printer having a plurality of interfaces, print setting can be stored individually for each of the interfaces. For example, in a printer having a USB interface and an IrDA interface, print setting for the USB interface and print setting for the IrDA interface can be made through the respective interfaces. Furthermore, the print setting may be made by key operations, as in the fifth embodiment. Similarly to the embodiments described above, print setting herein include, for example, sheet size, paper type, layout, print quality, image processing method, number of copies, and the like.

The effective period of the print setting and the method of changing the print setting are the same as in the embodiments described above.

Figure 18:
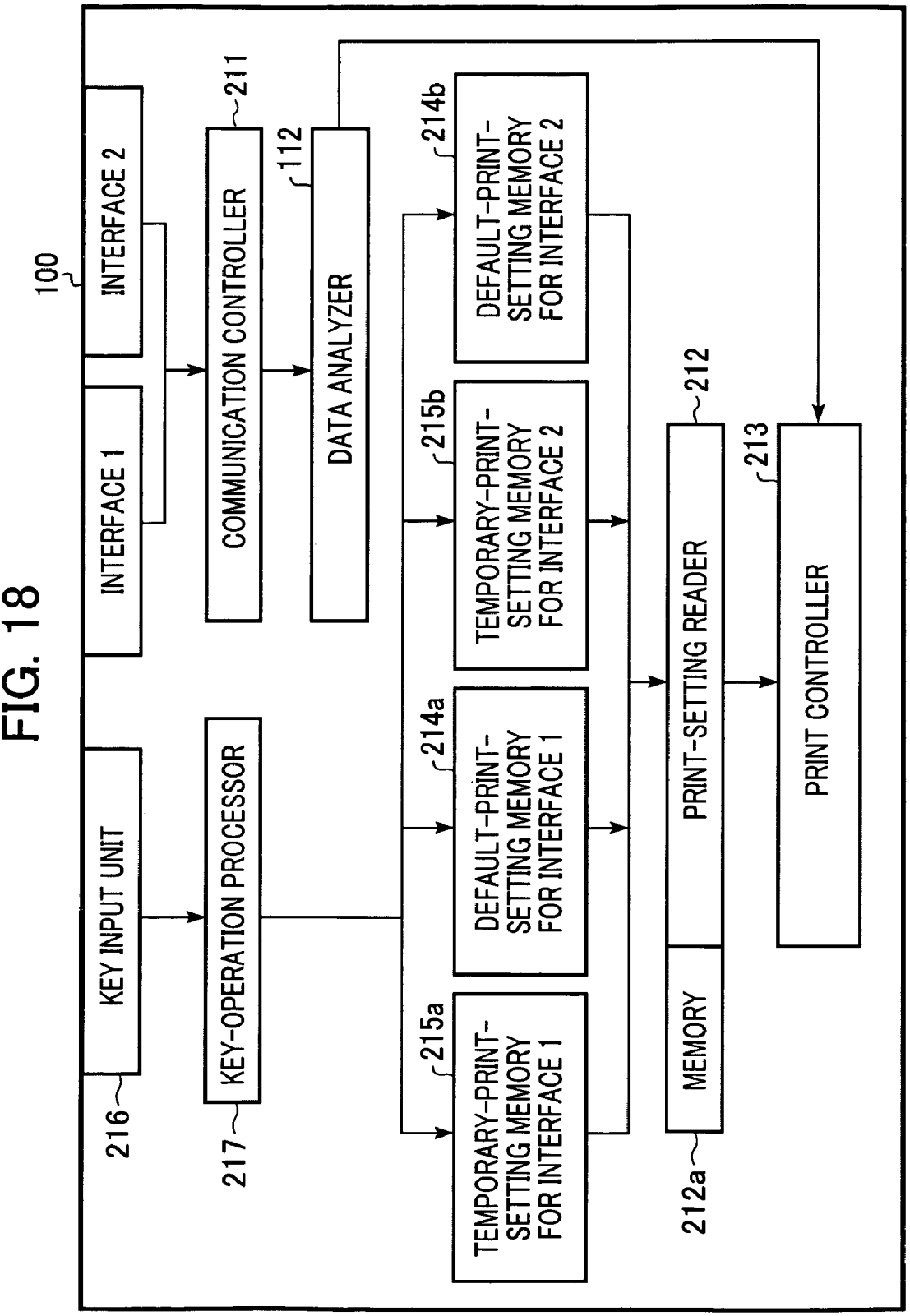
FIG. 18 is a functional block diagram of a printer according to a tenth embodiment of the present invention.

FIG. 18 is a functional block diagram of a printer 100 according to the tenth embodiment. In FIG. 18, parts corresponding to those in the embodiments described above are designated by the same numerals. Referring to FIG. 18, the printer 100 has a first interface that is used for infrared communications, and a second interface that is used for USB communications. The printer includes a temporary-print-setting memory 215a for the infrared communication interface, and a default-print-setting memory 214a for the infrared communication interface. The printer 100 also includes a temporary-print-setting memory 215b for the USB interface, and a default-print-setting memory 214b for the USB interface.

The procedures of processes executed in the ninth and tenth embodiments will be readily understood by applying processes shown in the flowcharts relating to the first to eighth embodiments to each of the interfaces. Thus, flowcharts showing the procedures are omitted.

Figure 19:
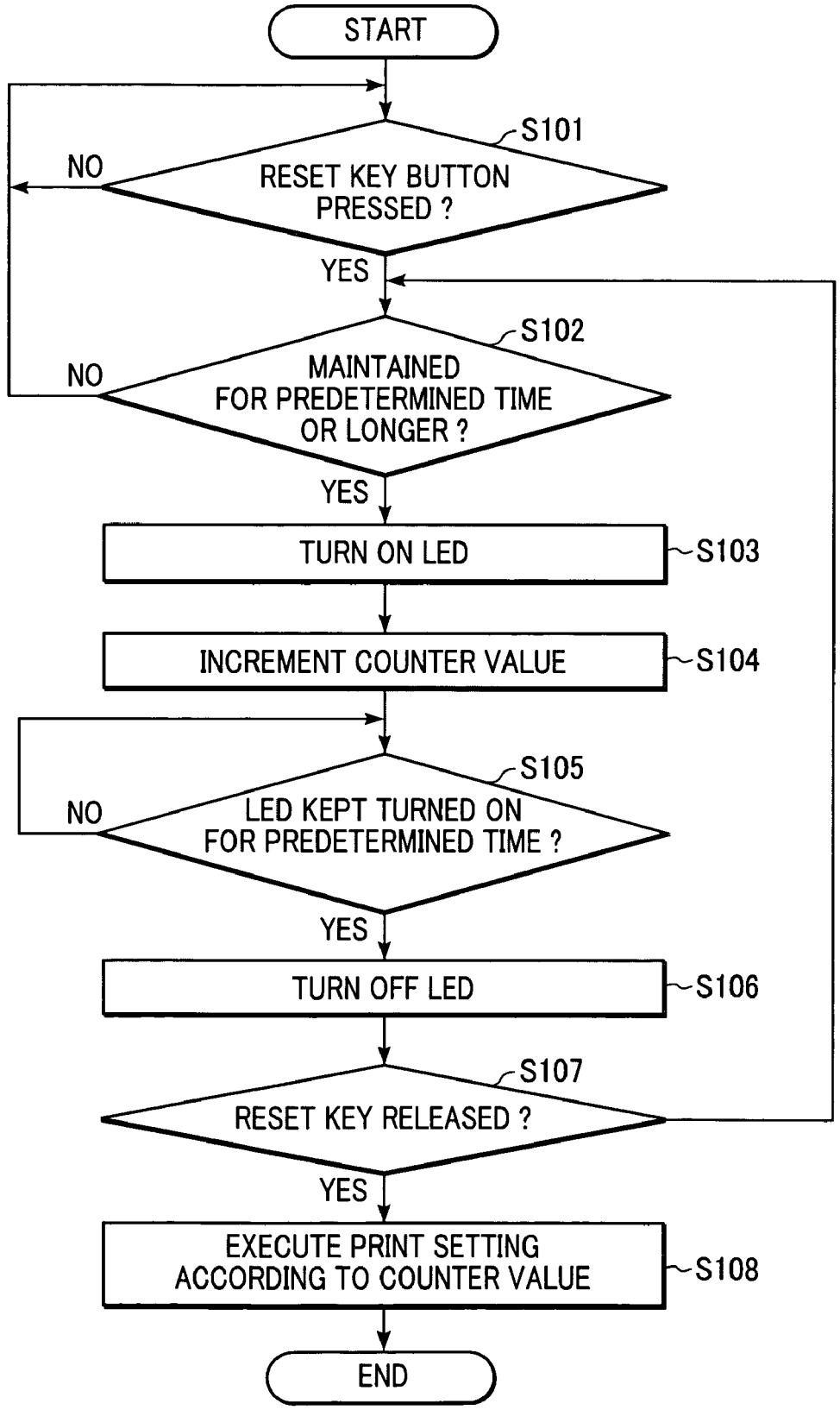
FIG. 19 is a flowchart for explaining print setting by keys of a printer according to an embodiment of the present invention.

FIG. 19 is a flowchart showing an example of a process of print setting by key operations of the printers 100 in the fifth to eighth and tenth embodiments.

In this example, a printer 100 has operation keys including a reset key for returning from an error or stopping a print operation, and a power key for turning power on or off. Thus, description will be made using an example where the rest key and the power key are used.

In step S101, while the printer 100 is not in a print operation, it is determined whether the reset key is pressed. If the reset key is pressed, the process proceeds to step S102, in which it is determined whether the reset key is kept pressed for a predetermined time or longer. If so, the process proceeds to step S103, in which, for example, an LED for indicating an error is turned on. Then, in step S104, a counter is incremented. In step S105, it is determined whether the LED is kept turned on for a predetermined time. If so, the process proceeds to step S106, in which the LED is turned off. Then, in step S107, it is determined whether the reset key is released. If the reset key is not released, the process repeats steps S102 to S107 described above. If the reset key is released, the process proceeds to step S108, in which print setting is changed according to the number of times the LED is turned on and off, i.e., the value of the counter. This allows various print setting.

For example, if the reset key is released after the LED is turned on and off seven times, the sheet size is switched between the name card size and the L size. If the reset key is released after the LED is turned on and off six times, switching occurs between a fine mode in which special coated paper for printing photographs is used and an ordinary paper mode in which inexpensive normal paper is used.

Instead of switching a specific print parameter according to the number of times the LED is turned on and off before the reset key is released, for example, a print parameter may be specified according to the number of times the LED is turned on and off before the reset key is released. For example, the name card size is chosen when the reset key is released after the LED is turned on and off five times, and the L size is chosen when the reset key is released after the LED is turned on and off six times.

Print setting by key operations is not limited to key operations described above. For example, an online key or power key usually provided on a printer may be used. Furthermore, without limitation to the number of times the LED is turned on and off, for example, setting may be based on buzzer sound. Furthermore, although the ninth and tenth embodiments have been described in the context of multi-interface printers having USB and IrDA interfaces, without limitation to USB and IrDA interfaces, the present invention can be applied to a printer having a plurality of interfaces for wireless communications, or a printer having other types of interfaces for wired communications. For example, a plurality of interfaces for wireless communications, such as an IrDA infrared communication interface and a Bluetooth wireless communication interface, may be provided, allowing print setting individually for each of the interfaces, so that print setting for each of the interfaces can be stored.

Although the embodiments have been described independently or in relation to each other, the features of the embodiments may be implemented independently or in combination with each other.

Other Embodiments

In the embodiments described above, the printer 100 shown in FIG. 1 includes a plurality of interfaces such as the USB interface 140 and the infrared communication interface 105. When none of the interfaces is in active communication, each of the interfaces is ready for communication. When one of the interfaces starts communication, communications by the other interfaces are prohibited. When the communication is finished and processing for printing is finished, for example, when printing of a final page is finished, the printer 100 enters a wait state again. Thus, even if data from an external personal computer is received via the USB interface 140 while communication is taking place via the infrared communication interface 105, data received via the infrared communication interface 105 is printed first. The objects of the present invention can also be achieved by providing a system or apparatus with a storage medium storing program code of software implementing functions of the embodiments so that a computer (CPU or MPU) of the system or apparatus can read and execute the program code stored in the storage medium. In that case, the functions of the embodiments described above are implemented by the program code read from the storage medium, so that the storage medium storing the program code falls within the scope of the present invention. The storage medium for supplying the program code may be, for example, a floppy disk, a hard disk, an optical disk, a magneto-optical disk, a CD-ROM, a CD-R, a magnetic tape, a non-volatile memory card, or a ROM.

Instead of implementing the functions of the embodiments by the program code read and executed by a computer, an operating system (OS) running on the computer may execute part of or the entire processing according to the program code to achieve the functions of the embodiments. This also falls within the scope of the present invention.

Furthermore, in order to achieve the functions of the embodiments, the program code read from the storage medium may be written to a memory of a function extension board disposed in the computer or a function extension unit connected to the computer so that a CPU or the like of the function extension board or the function extension unit will execute part of or the entire processing according to the program code. This also falls within the scope of the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A recording apparatus for receiving and recording data transmitted by wireless from an image-data supplying device, the recording apparatus comprising:
   key operation means having one or more keys that can be operated by a user, the one or more keys includes a reset key indicating a release of an error state or an interruption of printing;
   control means for turning a light indicator on and off during a time period from a point when the reset key is pressed for a predetermined time or longer until a point when the condition of the reset key to be pressed is released;
   setting means for setting one or more recording parameters according to a reset key operation by the key operation means, and setting the one or more recording parameters based on a time period when the reset key is pressed, and a number of times that the control means turns the light indicator on and off during the time period when the reset key is pressed; and
   recording control means for recording an image on a recording medium based on image data included in data transmitted from the image-data supplying device separately from the setting data;
   wherein when the recording parameters have been set by the setting means, the recording control means records an image according to the recording parameters.

2. The apparatus according to claim 1, wherein the recording control means applies the recording parameters set by the setting means only to image data that is recorded first after the recording parameters are set by the setting means.

3. The apparatus according to claim 1, wherein the recording control means applies the recording parameters set by the setting means as recording parameters that are effective until the recording apparatus is powered off.

4. The apparatus according to claim 1, wherein the recording control means applies the recording parameters as default recording parameters.

5. The apparatus according to claim 1, further comprising:
   a first interface that allows receiving data by wireless; and
   a second interface for receiving data from an image-data supplying device, the second interface being different from the first interface;
   wherein the setting means sets one or more recording parameters for each of the first and second interfaces.

6. A method for controlling recording of a recording apparatus for receiving and recording data transmitted by wireless from an image-data supplying device, the method comprising:
   a key input step of inputting key information according to an operation by a user, the one or more keys includes a reset key indicating a release of an error state or an interruption of printing;
   a control step of turning a light indicator on and off during a time period from a point when the reset key is pressed for a predetermined time or longer until a point when the condition of the reset key to be pressed is released;
   a setting step of setting one or more recording parameters according to a reset key operation in the key input step, and setting the one or more recording parameters based on a time period when the reset key is pressed, and a number of times that the control step turns the light indicator on and off during the time period when the reset key is pressed; and
   a recording control step of recording an image based on image data included in data transmitted from the image-data supplying device, the data having a data format that is dependent on the image-data supplying device;
   wherein when the recording parameters have been set in the setting step, an image is recorded according to the recording parameters in the recording control step.

* * * * *